US012613506B2

(12) United States Patent
Suemasu et al.

(10) Patent No.: US 12,613,506 B2
(45) Date of Patent: Apr. 28, 2026

(54) INFORMATION PROCESSING METHOD AND NON- TRANSITORY COMPUTER READABLE STORAGE MEDIUM

(71) Applicant: Panasonic Intellectual Property Corporation of America, Torrance, CA (US)

(72) Inventors: Satoshi Suemasu, Osaka (JP); Kenta Murakami, Osaka (JP); Yuki Takaoka, Osaka (JP); Masafumi Ishikawa, Tokyo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 350 days.

(21) Appl. No.: 18/235,971

(22) Filed: Aug. 21, 2023

(65) Prior Publication Data

US 2023/0393548 A1      Dec. 7, 2023

Related U.S. Application Data

(63) Continuation of application No. PCT/JP2022/003759, filed on Feb. 1, 2022.

(30) Foreign Application Priority Data

Feb. 24, 2021    (JP) ................................. 2021-027360

(51) Int. Cl.
*G05B 19/05*              (2006.01)
(52) U.S. Cl.
CPC ......... *G05B 19/054* (2013.01); *G05B 19/056* (2013.01); *G05B 2219/163* (2013.01)
(58) Field of Classification Search
CPC ................ G05B 19/054; G05B 19/056; G05B 2219/163; G05B 19/042; G06F 8/33; G06Q 30/02; G06Q 50/10
See application file for complete search history.

(56) References Cited

U.S. PATENT DOCUMENTS 9,164,656 B1 * 10/2015 Keller .............. G05B 19/41865
2012/0278331 A1 * 11/2012 Campbell ........ H04N 21/44204
707/E17.09

(Continued)

FOREIGN PATENT DOCUMENTS

JP        2003-284889        10/2003

OTHER PUBLICATIONS

International Search Report issued in International Pat. Appl. No. PCT/JP2022/003759, dated Apr. 19, 2022, along with an English translation thereof.

*Primary Examiner* — Christopher W Carter

(74) *Attorney, Agent, or Firm* — Greenblum & Bernstein, P.L.C.

(57)            ABSTRACT

Provided is an information processing method including, by a computer of a system that creates an application of controlling multiple devices: outputting a first operation screen having multiple time frames; receiving a first operation of disposing multiple blocks in columns of the corresponding multiple time frames to generate the application, the multiple blocks each having operation of at least one device of the multiple devices and an intervention degree indicating a degree of involvement of a user in the operation of the at least one device; calculating a sum of intervention degrees of one or more blocks disposed in each of the time frames; and outputting the application including information on the sum of intervention degrees and the multiple blocks disposed in the multiple time frames.

14 Claims, 22 Drawing Sheets

(56)        References Cited

U.S. PATENT DOCUMENTS

2012/0296488 A1 *  11/2012  Dharwada ......... H02J 13/00024
                                                        700/296
2017/0285594 A1 *  10/2017  Stewart ..................... G05F 1/66
2021/0342785 A1 *  11/2021  Mann ............... G06Q 10/06316

* cited by examiner

FIG.2

| INTERVENTION DEGREE | OPERATION OF CONTROL TARGET |
|---|---|
| 0 | OPERATION NOT REQUIRING USER TO BE INVOLVED |
| 1 | OPERATION PERIODICALLY REQUIRING VISION, HEARING, OR SMELL OF USER |
| 2 | OPERATION PERIODICALLY REQUIRING MANUAL WORK OF USER |
| 3 | OPERATION ALWAYS REQUIRING VISION, HEARING, OR SMELL OF USER |
| 3 | OPERATION ALWAYS REQUIRING MANUAL WORK OF USER |

FIG.3

| INTERVENTION DEGREE | OPERATION OF CONTROL TARGET |
|---|---|
| 100% | DISPLAY WORK CONTENTS OF USER ON DISPLAY |
| 95% | FRYING OR MIXING WITH IH COOKING HEATER |
| 85% | DEEPFRYING OR BAKING WITH IH COOKING HEATER |
| 50% | HEAT WITH MICROWAVE OVEN (PERIODICALLY MONITOR STATE OF INGREDIENT) |
| 30% | BOILING OR STEAMING WITH IH COOKING HEATER |
| 10% | BOILING WITH PRESSURE COOKER (PERIODICALLY MONITOR STATE OF PRESSURE) |
| 0% | AUTOMATICALLY COOKING WITH MULTI-COOKER |

| TIME FRAME / DEVICE | 10 | 20 | 30 | 40 | 50 | 60 | 70 | 80 | 90 | 100 | 110 |
|---|---|---|---|---|---|---|---|---|---|---|---|
| DISPLAY | PREPARATION | BAKING | | | | WEIGHING | CUTTING | MIXING | BOILING | | SERVING |
| OVEN RANGE | | BAKING | | | | | | | | | |
| MULTI-COOKER | | | | | | | | | BOILING | | |
| CUTTING BOARD | | | | | | WEIGHING | CUTTING | | | | |
| INTERVENTION DEGREE | INTERVENTION DEGREE 3 | | INTERVENTION DEGREE 0 | | | INTERVENTION DEGREE 3 | | | INTERVENTION DEGREE 0 | | INTERVENTION DEGREE 3 |

| FIRST INTERVENTION DEGREE CONDITION | SECOND INTERVENTION DEGREE CONDITION | TIME CONDITION |
|---|---|---|
| 0 | 3 | 5 MINUTES OR MORE |
| | 2 | 5 MINUTES OR MORE |
| | 1 | 5 MINUTES OR MORE |
| 1 | 2 | 5 MINUTES OR MORE |
| | 1 | 5 MINUTES OR MORE |
| 2 | – | – |
| 3 | – | – |

Figure 11:
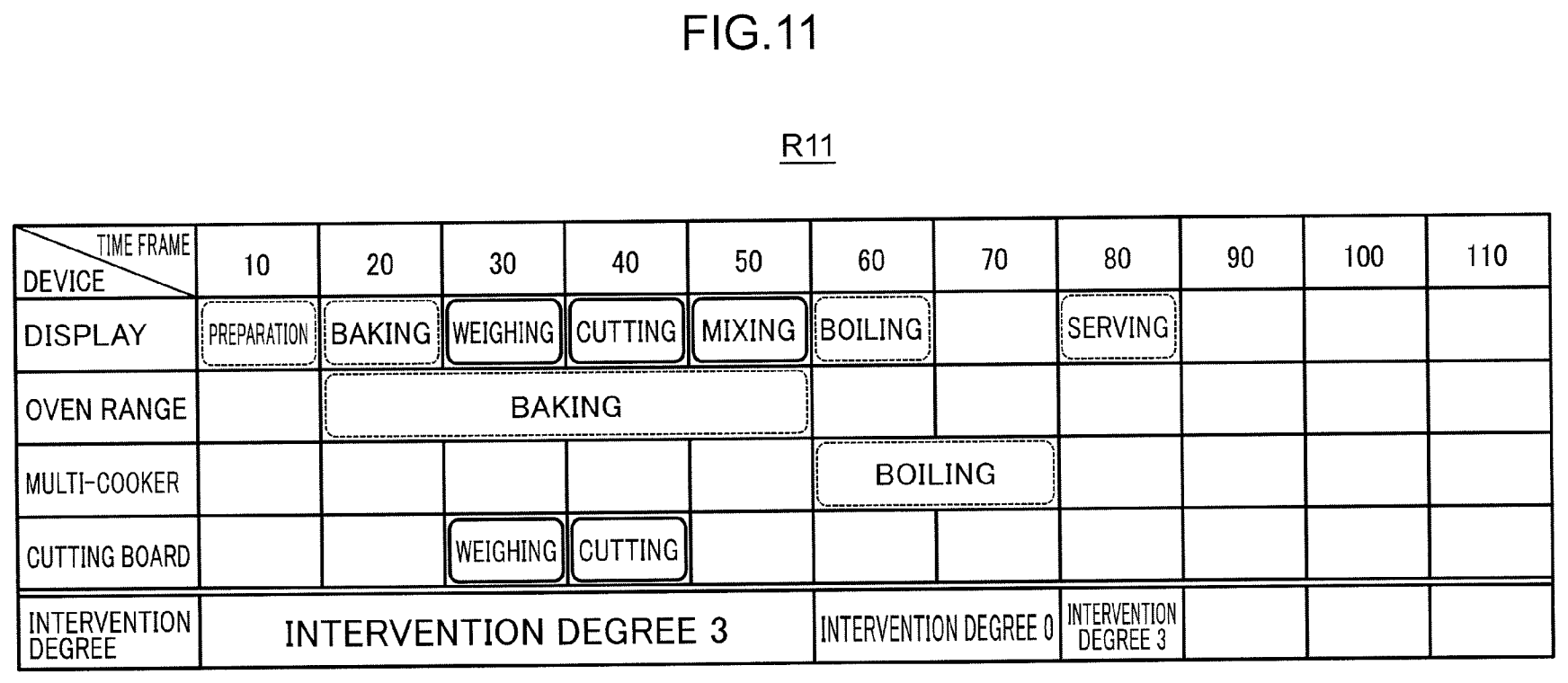

| TIME FRAME / DEVICE | 10 | 20 | 30 | 40 | 50 | 60 | 70 | 80 | 90 | 100 | 110 |
|---|---|---|---|---|---|---|---|---|---|---|---|
| DISPLAY | PREPARATION | BAKING | WEIGHING | CUTTING | MIXING | BOILING | | SERVING | | | |
| OVEN RANGE | | BAKING | | | | | | | | | |
| MULTI-COOKER | | | | | | BOILING | | | | | |
| CUTTING BOARD | | | WEIGHING | CUTTING | | | | | | | |
| INTERVENTION DEGREE | INTERVENTION DEGREE 3 | | | | | INTERVENTION DEGREE 0 | | INTERVENTION DEGREE 3 | | | |

| INTERVENTION DEGREE CONDITION | TIME CONDITION | EXISTING RECIPE |
|---|---|---|
| 0 | 10 MINUTES OR LESS | MAKING OMELET |
| | 30 MINUTES OR LESS | MAKING BUTTER |
| 1 | 30 MINUTES OR LESS | MAKING SALAD |
| 2 | – | – |
| 3 | – | – |

Figure 13:
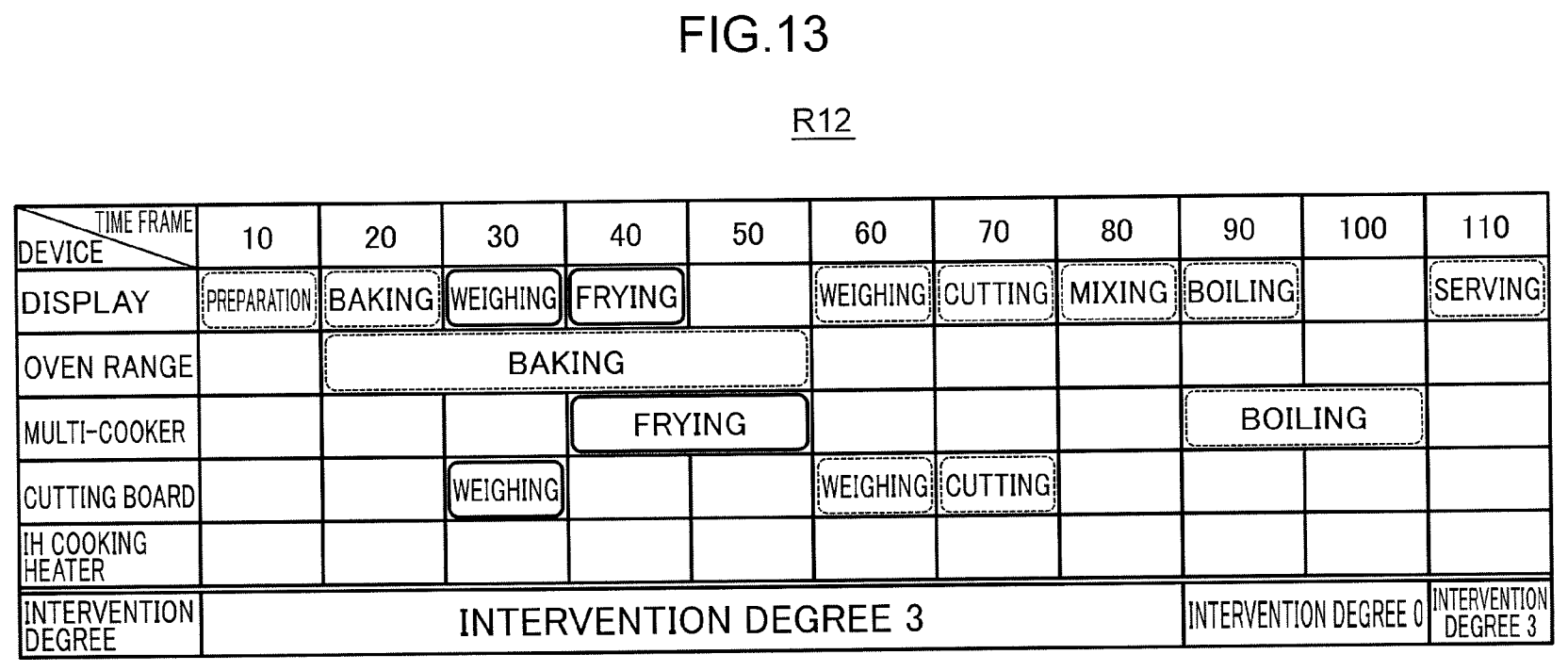

| TIME FRAME / DEVICE | 10 | 20 | 30 | 40 | 50 | 60 | 70 | 80 | 90 | 100 | 110 |
|---|---|---|---|---|---|---|---|---|---|---|---|
| DISPLAY | PREPARATION | BAKING | WEIGHING | FRYING | | WEIGHING | CUTTING | MIXING | BOILING | | SERVING |
| OVEN RANGE | | BAKING | | | | | | | | | |
| MULTI-COOKER | | | | FRYING | | | | | BOILING | | |
| CUTTING BOARD | | | WEIGHING | | | WEIGHING | CUTTING | | | | |
| IH COOKING HEATER | | | | | | | | | | | |
| INTERVENTION DEGREE | INTERVENTION DEGREE 3 | | | | | | | | INTERVENTION DEGREE 0 | | INTERVENTION DEGREE 3 |

FIG.14

| INTERVENTION DEGREE CONDITION | TIME CONDITION | ADVERTISEMENT BLOCK |
|---|---|---|
| 0 | 1 MINUTE OR LESS | VOICE ADVERTISEMENT a |
| | 10 MINUTES OR LESS | VOICE ADVERTISEMENT b DISPLAY ADVERTISEMENT a |
| | 30 MINUTES OR LESS | VOICE ADVERTISEMENT c DISPLAY ADVERTISEMENT b |
| 1 | 1 MINUTE OR LESS | VOICE ADVERTISEMENT d |
| | 10 MINUTES OR LESS | VOICE ADVERTISEMENT e |
| | 30 MINUTES OR LESS | VOICE ADVERTISEMENT f |
| 2 | 30 MINUTES OR LESS | VOICE ADVERTISEMENT g |
| 3 | — | — |

| TIME FRAME / DEVICE | 10 | 20 | 30 | 40 | 50 | 60 | 70 | 80 | 90 | 100 | 110 |
|---|---|---|---|---|---|---|---|---|---|---|---|
| DISPLAY | PREPARATION | BAKING | ADVERTISEMENT b | | | WEIGHING | CUTTING | MIXING | BOILING | ADVERTISEMENT a | SERVING |
| OVEN RANGE | | BAKING | | | | | | | | | |
| MULTI-COOKER | | | | | | | | | BOILING | | |
| CUTTING BOARD | | | | | | WEIGHING | CUTTING | | | | |
| INTERVENTION DEGREE | INTERVENTION DEGREE 3 | | INTERVENTION DEGREE 1 | | | INTERVENTION DEGREE 3 | | | INTERVENTION DEGREE 0 | INTERVENTION DEGREE 1 | INTERVENTION DEGREE 3 |

| INTERVENTION DEGREE CONDITION | TIME CONDITION | CANDIDATE WORK |
|---|---|---|
| 0 | 30 MINUTES OR LESS | SHOPPING |
| 1 | 10 MINUTES OR LESS | WASHING-RELATED |
| 2 | 30 MINUTES OR LESS | MUSIC APPRECIATION |
| 3 | – | – |

INFORMATION PROCESSING METHOD AND NON- TRANSITORY COMPUTER READABLE STORAGE MEDIUM

FIELD OF INVENTION

The present disclosure relates to a technique for creating an application for controlling multiple devices.

BACKGROUND ART

Demand for in-home services in which multiple devices are linked together increases. For example, Patent Literature 1 describes a washing machine capable of communicating information with a home terminal, together with a refrigerator, a microwave oven, an air conditioner, a cooking heater, and the like via a home LAN. Additionally, to easily create an application for controlling a device, for example, development tools such as Scratch (registered trademark), Node-RED (registered trademark), and Windows Movie Maker (registered trademark) have been proposed.

Specifically, such a development tool enables a creator of an application to easily create an application for controlling multiple devices by disposing multiple blocks representing respective multiple abstracted operations of each of the devices for the corresponding multiple devices in time series on an operation screen.

In recent years, demand for user-interactive applications involving not only cooperation between multiple devices but also human actions has increased. To develop such an application, it is important to consider not only operation of the devices but also work and a flow line of a user.

Unfortunately, although the development tool described above can easily instruct the operation of the devices, a degree of involvement of a user in the operation of the devices (hereinafter, referred to as an intervention degree of a user) is not presented. Thus, a developer of the application is less likely to dispose the blocks in the order suitable for the intervention degree of a user and create the application that is easy and comfortable for the user to use.

Patent Literature 1: JP 2003-284889 A

SUMMARY OF THE INVENTION

The present disclosure has been made to solve the above problems, and an object thereof is to present an information processing method and a program capable of creating an application that is easy and comfortable for a user to use and that controls multiple devices.

An information processing method according to an aspect of the present disclosure includes, by a computer of a system that creates an application of controlling multiple devices: outputting a first operation screen having multiple time frames; receiving a first operation of disposing multiple blocks in columns of the corresponding multiple time frames to generate the application, the multiple blocks each having operation of at least one device of the multiple devices and an intervention degree indicating a degree of involvement of a user in the operation of the at least one device; calculating a sum of intervention degrees of one or more blocks disposed in each of the time frames; and outputting the application including information on the sum of intervention degrees and the multiple blocks disposed in the multiple time frames.

BRIEF DESCRIPTION OF THE DRAWINGS

FIG. 2 is a diagram illustrating an example of definition of an intervention degree.

FIG. 3 is a diagram illustrating another example of the definition of an intervention degree.

FIG. 4 is a block diagram illustrating an example of a functional configuration of a development terminal.

FIG. 9 is a diagram illustrating an example of a recipe created by a creator.

FIG. 10 is a diagram illustrating an example of a movement determination table.

FIG. 11 is a diagram illustrating an example of a recipe reflecting proposal contents.

FIG. 12 is a diagram illustrating an example of a first rule table.

FIG. 13 is a diagram illustrating an example of a recipe reflecting another proposal contents.

FIG. 14 is a diagram illustrating an example of a second rule table.

FIG. 15 is a diagram illustrating an example of a recipe reflecting still another proposal contents.

FIG. 17 is a block diagram illustrating an example of a functional configuration of a user terminal.

FIG. 21 is a diagram illustrating an example of a third rule table.

DETAILED DESCRIPTION

Background to the Present Disclosure

Figure 1:
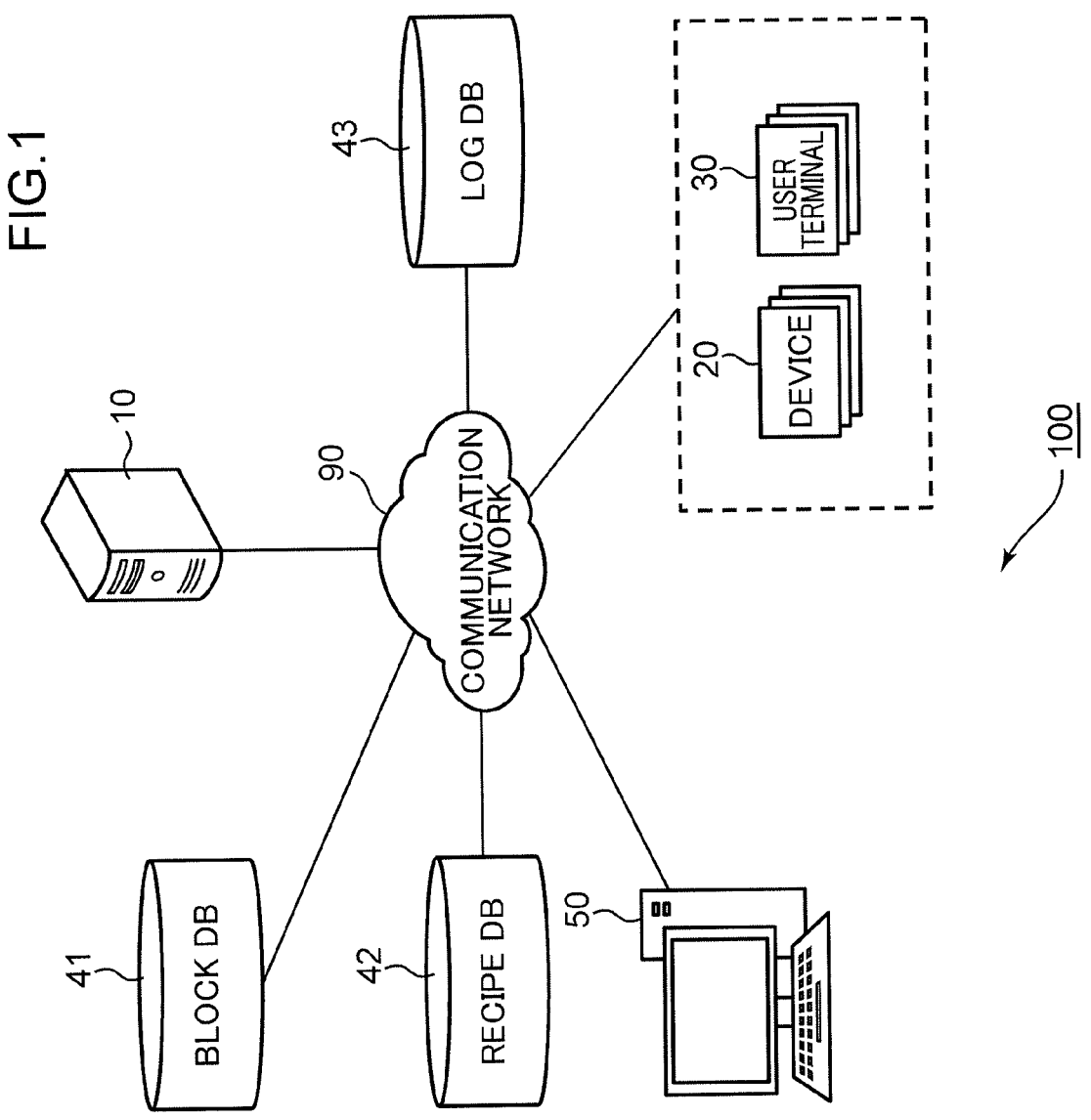
FIG. 1 is a block diagram illustrating an example of a general configuration of an application providing system.

As described above, demand for in-home services in which multiple devices are linked together increases as described in Patent Literature 1, for example. However, a control program for a device is developed by a developer who is familiar with the device, and thus cannot be easily customized and updated by a person who is not familiar with the device. Thus, to enable a person who is not familiar with devices to easily create an application for controlling the multiple devices, there has been proposed a development tool that can easily create an application for controlling the multiple devices by disposing multiple blocks in time series as described above.

In recent years, demand for user-interactive applications involving human actions in addition to linkage between devices has increased, such as for driving a rice cooker, a microwave oven, an induction heating (IH) cooking heater, and the like in accordance with user's actions recognized using a cutting board, a display, and a microphone, for example. To develop such an application, it is important to consider not only operation of the devices but also work and a flow line of a user.

For example, after putting dough in a microwave oven to bake bread in the microwave oven, a user is not involved in operation of the microwave oven until the bread is baked. Here, enabling the user to make jam to be put on the bread allows the user to perform work of baking the bread and making the jam in parallel, and then the user can secure time for other housework. This also enables the user to learn how to make jam, and thus leading to improvement of quality of life (QOL).

Unfortunately, although the development tool described above can easily instruct operation of devices, a degree of involvement of a user in the operation of the devices (hereinafter, referred to as an intervention degree of a user) is not presented. Thus, a developer of the application is less likely to dispose the blocks in the order suitable for the intervention degree of a user and create the application that is easy and comfortable for the user to use.

Therefore, the present inventors have intensively studied a technique of creating an application in consideration of the intervention degree of a user, the application being easy and comfortable for the user to use and controlling multiple devices, and thus having reached each aspect of the present disclosure described below.

An information processing method according to an aspect of the present disclosure includes, by a computer of a system that creates an application of controlling multiple devices: outputting a first operation screen having multiple time frames; receiving a first operation of disposing multiple blocks in columns of the corresponding multiple time frames to generate the application, the multiple blocks each having operation of at least one device of the multiple devices and an intervention degree indicating a degree of involvement of a user in the operation of the at least one device; calculating a sum of intervention degrees of one or more blocks disposed in each of the time frames; and outputting the application including information on the sum of intervention degrees and the multiple blocks disposed in the multiple time frames.

This configuration allows output of the application including the information on the sum of intervention degrees of one or more blocks disposed in each of the multiple time frames included in the first operation screen and the multiple blocks disposed in the corresponding multiple time frames. Thus, the creator can dispose the multiple blocks in columns of the appropriate time frames in consideration of the degree of involvement of a user in each of the time frames. As a result, the creator can create an application for controlling multiple devices, the application being user-friendly and comfortable.

The above information processing method may further include, by the computer, determining a first time frame based on the sum of intervention degrees of the time frames, the first time frame being one time frame or multiple consecutive time frames in which a degree of involvement of a user is lower than a reference intervention degree, and outputting proposal information indicating a proposal of disposing another one or more blocks for the first time frame.

This configuration enables the creator to easily dispose another one or more blocks in the first time frame in which the degree of involvement of a user is lower than the reference intervention degree according to contents of the proposal indicated by the proposal information. As a result, the creator can create an efficient application with a small time frame in which the user is not involved.

In the above information processing method, the other one or more blocks may be included in the multiple blocks disposed by the first operation.

This configuration enables the creator to easily move the other one or more blocks disposed in a time frame different from the first time frame to the first time frame according to the contents of the proposal indicated by the proposal information. As a result, the creator can reduce time required for executing the application to be created.

In the above information processing method, the other one or more blocks may be one or more blocks constituting a created application stored in the system.

This configuration enables the creator to easily dispose one or more blocks constituting the created application stored in the system in the first time frame according to the contents of the proposal indicated by the proposal information. As a result, the creator can create an efficient application that can cause the user to execute another application in a time frame with a low degree of involvement of a user.

In the above information processing method, the other one or more blocks may be one or more blocks indicating presentation of advertisement information.

This configuration enables the creator to easily dispose one or more blocks indicating presentation of advertisement information in the first time frame according to the contents of the proposal indicated by the proposal information. As a result, the creator can create an efficient application that can present advertisement information in a time frame with a low degree of involvement of a user.

In the above information processing method, the other one or more blocks may be included in at least two block groups among a first block group including multiple blocks disposed by the first operation, a second block group including one or more blocks constituting a created application stored in the system, and a third block group including one or more blocks indicating presentation of advertisement information, and the proposal information may include information indicating an effect obtained by disposing the other one or more blocks.

This configuration enables the creator to grasp an effect from the proposal information, the effect being obtained by disposing one or more blocks included in at least two block groups among the first block group, the second block group, and the third block group, in the first time frame. As a result, the creator can effectively dispose another one or more blocks in the first time frame with a low degree of involvement of a user with reference to the effect.

The above information processing method may further include, by the computer: receiving setting of a timer condition for automatically continuing operation of the at least one device indicated by each of the multiple blocks disposed by the first operation for a predetermined time for the respective multiple blocks; and reducing the intervention degree of each of the blocks in which the timer condition is set by a predetermined degree.

This configuration allows the operation of the at least one device indicated by each block is automatically continued for a predetermined time in the block in which the timer condition is set. As a result, the degree of involvement of a user in the operation of the at least one device indicated by the block in which the timer condition is set can be reduced. Additionally, this configuration also enables an intervention degree of the block in which the timer condition is set to be appropriately changed to an intervention degree reduced as compared with that of a block in which the timer condition is not set.

In the above information processing method, each of the blocks may further have duration during which the operation of the at least one device indicated by the corresponding one of the blocks is continued, and the outputting the proposal information may include determining one or more blocks among the multiple blocks disposed by the first operation as the other one or more blocks to move the one or more blocks among the multiple blocks disposed by the first operation to the first time frame, using a table defining a relationship among a first intervention degree condition to be satisfied by the sum of intervention degrees of the first time frame, a second intervention degree condition to be satisfied by the intervention degree of the one or more blocks, and a time condition that is based on a length of the first time frame and that is to be satisfied by the duration of the one or more blocks, the one or more blocks having the intervention degree and the duration that satisfy the second intervention degree condition and the time condition that are corresponding to the first intervention degree condition satisfied by the sum of intervention degrees of the first time frame, respectively, in the table.

This configuration enables the creator to move one or more blocks suitable for the sum of intervention degrees of the first time frame and the length of the first time frame determined using the table among the multiple blocks constituting the application in preparation to the first time frame according to the contents of the proposal indicated by the proposal information.

In the above information processing method, the outputting the proposal information may include determining an existing application stored in the system as the created application to dispose the existing application in the first time frame, using a first table defining a relationship among an intervention degree condition to be satisfied by the sum of intervention degrees of the first time frame, the time condition to be satisfied by the length of the first time frame, and the existing application, the existing application corresponding to the intervention degree condition satisfied by the sum of intervention degrees of the first time frame and the time condition satisfied by the length of the first time frame in the first table.

This configuration enables the creator to add one or more blocks to the first time frame, the one or more blocks being determined using the first table according to the contents of the proposal indicated by the proposal information and constituting an existing application suitable for the sum of intervention degrees of the first time frame and the length of the first time frame.

In the above information processing method, the outputting the proposal information may include determining one or more advertisement blocks as the other one or more blocks to dispose each of the one or more advertisement blocks indicating presentation of advertisement information in the first time frame, using a second table defining a relationship among an intervention degree condition to be satisfied by the sum of intervention degrees of the first time frame, a time condition to be satisfied by the length of the first time frame, and the one or more advertisement blocks, the one or more advertisement blocks corresponding to the intervention degree condition satisfied by the sum of intervention degrees of the first time frame and the time condition satisfied by the length of the first time frame in the second table.

This configuration enables the creator to add one or more advertisement blocks indicating the presentation of the advertisement information to the first time frame, the one or more advertisement blocks being determined using the second table according to the contents of the proposal indicated by the proposal information and suitable for the sum of intervention degrees of the first time frame and the length of the first time frame.

The above information processing method may further include, by the computer: outputting a second operation screen having multiple time frames; disposing multiple blocks constituting one application to be executed in a time frame of the second operation screen, the time frame corresponding to a time frame disposed in the one application; calculating a sum of intervention degrees of one or more blocks disposed in each time frame of the second operation screen; and outputting an application including information on a sum of intervention degrees of the one or more blocks disposed in each time frame of the second operation screen and the multiple blocks disposed in the corresponding multiple time frames of the second operation screen.

This configuration allows an application to be output, the application including information on the sum of intervention degrees of one or more blocks that constitute one application to be executed and that are disposed in the corresponding time frames included in the second operation screen and the multiple blocks disposed in the corresponding multiple time frames. As a result, the user who executes the one application can easily grasp a degree of involvement of a user in each of time frames during the execution of the one application from the information on the sum of intervention degrees of each of the time frames included in the application output.

The above information processing method may further include, by the computer: receiving an operation of executing the one application; and outputting second proposal information proposing performing predetermined work during the execution of the one application based on the sum of intervention degrees of the time frame corresponding to a present time on the second operation screen.

This configuration enables the user having performed operation of executing one application to perform the predetermined work according to the contents of the proposal indicated by the second proposal information during execution of the one application. As a result, the user can effectively use time.

In the above information processing method, an intervention degree of each of the blocks may be determined based on: a degree of necessity of vision, hearing, or smell of the user for operation of the at least one device indicated by each block; a degree of necessity of manual work of the user for operation of the at least one device indicated by each block; or a frequency of the necessity of vision, hearing, or smell of the user, or manual work of the user, for the operation of the at least one device indicated by each of the blocks.

This configuration allows the intervention degree of each of the blocks to be determined based on a degree of necessity of vision, hearing, or smell of a user for operation of the at least one device indicated by each block; a degree of necessity of manual work of the user for the operation; or a frequency of the necessity of vision, hearing, or smell of the user, or manual work of the user, for the operation. As a result, the creator can appropriately grasp a degree of involvement of a user in each of time frames from information on the sum of intervention degrees of each of the time frames included in the application output.

A non-transitory computer readable storage medium according to another aspect of the present disclosure is a non-transitory computer readable storage medium storing a program for causing a computer of a system that creates an application of controlling multiple devices to function, the program causing the computer to function as: an output controller that outputs a first operation screen having multiple time frames; a receiver that receives a first operation of disposing multiple blocks in columns of the corresponding multiple time frames to generate the application, the multiple blocks each having operation of at least one device of the multiple devices and an intervention degree indicating a degree of involvement of a user in the operation of the at least one device; a calculator that calculates a sum of intervention degrees of one or more blocks disposed in each of the time frames; and a presentation unit that outputs the application including information on the sum of intervention degrees and the multiple blocks disposed in the multiple time frames.

This configuration enables acquiring an effect similar to that of the information processing method described above.

The present disclosure can also be implemented as a system that operates by using such a program. It is needless to say that such a computer program can be distributed with a computer-readable and non-transitory recording medium such as a CD-ROM or via a communication network such as the Internet.

Each of embodiments described below illustrates a specific example of the present disclosure. The embodiments below show numerical values, shapes, components, steps, order of steps, and the like that are merely examples, and that are not intended to limit the present disclosure. The components in the embodiments below include components that are not described in independent claims indicating the highest concept and that are described as optional components. All the embodiments have respective contents that can be combined.

First Embodiment

Hereinafter, an embodiment of the present disclosure will be described with reference to the drawings. FIG. 1 is a diagram illustrating an example of a general configuration of an application providing system 100. The application providing system 100 provides an application, which is created by a development terminal 50 to control multiple devices 20, to a user terminal 30 via a communication network 90.

Hereinafter, the application providing system 100 creating an application for cooking by controlling one or more cooking devices such as a rice cooker and a microwave oven will be described as an example. The application is referred to below as a program of a recipe. However, the application that can be created by the application providing system 100 is not limited to a program of a recipe, and may be an application that controls multiple household electrical appliances such as a washing machine and a refrigerator to do housework, for example.

Specifically, as illustrated in FIG. 1, the application providing system 100 includes the multiple devices 20, a block database 41, a recipe database 42, a log database 43, a development terminal 50, multiple user terminals 30, and an application providing server 10. For example, these components included in the application providing system 100 are connected via the communication network 90 such as the Internet.

Each device 20 is an electrical appliance used by a user, such as a rice cooker, an IH cooking heater, a multi-cooker, a scaler, a microwave oven, or an oven range, for example. The device 20 transmits log information indicating its own operating state to the application providing server 10 via the communication network 90. The log information includes a current date and time, identification information on the device 20, contents of operation of the device 20, a start time of the operation, information indicating whether abnormality occurs during the operation, and the like.

The block database 41 includes storage devices such as a hard disk drive (HDD) and a solid state drive (SSD). The block database 41 stores multiple blocks created by a developer of the device 20.

Each block includes a control program for controlling operation of at least one device 20, and is an abstracted representation of the control program. The block is formed as a screen component usable in the development terminal 50 and the user terminal 30. The block is created by the developer of the device 20 who is familiar with the device 20. The block includes a settable parameter related to the operation of the at least one device 20 indicated by the block.

For example, blocks of an oven range include a block representing an abstracted baking operation of the oven range and a block representing an abstracted steaming operation of the oven range. The block database 41 also stores blocks representing abstracted operations performed by multiple devices in conjunction with one another, such as a block representing an abstracted operation for creating a comfortable space using three devices of an air conditioner, an air purifier, and a speaker in conjunction with one another.

Hereinafter, a block representing an abstracted operation of "X" of at least one device 20 will be referred to as a block "X" of the at least one device 20. For example, a block representing an abstracted baking operation of the oven range is referred to as a block "baking" of the oven range. Then, a block representing an abstracted operation of creating a comfortable space using the three devices of the air conditioner, the air purifier, and the speaker in conjunction with one another is referred to as a block "creating a comfortable space" of the air conditioner, the air purifier, and the speaker.

Parameters settable in the block "baking" of the oven range include a preset temperature in the oven range, temperature reaching time required for the inside of the oven range to reach the preset temperature, duration for continuing the baking operation of the oven range, and the like.

Each of the blocks has an intervention degree indicating a degree of involvement of a person in operation of at least one device 20 indicated by the corresponding one of the blocks. For example, the intervention degree is determined based on a degree of necessity of vision, hearing, or smell of a user for the operation of the at least one device 20 indicated by each of the blocks. The intervention degree may be determined based on a degree of necessity of manual work of the user for the operation of the at least one device 20 indicated by each of the blocks. Alternatively, the intervention degree may be determined based on a frequency of necessity of the vision, the hearing, or the smell of the user, or manual work of the user, for the operation of the at least one device 20 indicated by each of the blocks.

FIG. 2 is a diagram illustrating an example of definition of an intervention degree. For example, FIG. 2 shows the intervention degree defined as 0 for a block indicating an operation that does not require the user to be involved in at all, such as each operation of a multi-cooker and an operation of creating a comfortable space using three devices of an air conditioner, an air purifier, and a speaker in conjunction with one another.

When boiling operation is performed with the IH cooking heater, it is considered that the user is required to periodically monitor a state of the boiling by using its vision, hearing, or smell. For a block indicating an operation that periodically requires vision, hearing, or smell of the user as described above, the intervention degree is defined as 1.

When heating operation is performed with the IH cooking heater, it is considered that the user is required to periodically perform stirring work. For a block indicating an operation that periodically requires manual work of the user as described above, the intervention degree is defined as 2.

When frying operation is performed with the IH cooking heater, it is considered that the user is required to always check whether ingredients are cooked in a desired state by using its vision, hearing, or smell. For a block indicating an operation that always requires vision, hearing, or smell of the user as described above, the intervention degree is defined as 3.

When weighing operation is performed with the scaler, the user is required to place an object to be weighed on the scaler and to check a weighing result. For a block indicating an operation that always requires manual work of the user as described above, the intervention degree is defined as 3.

Although the intervention degree is defined in four stages of 0 to 3 in the example of FIG. 2, a method for defining the intervention degree is not limited to the example of FIG. 2. FIG. 3 is a diagram illustrating another example of the definition of the intervention degree. For example, FIG. 3 shows an example of the intervention degree defined as 100% of a block that indicates that contents of work performed by the user, such as cutting, washing, serving, and seasoning of an ingredient, are displayed on a display.

FIG. 3 also shows an example of the intervention degree defined as 95% of a block that indicates operation of frying or mixing with the IH cooking heater. Additionally, FIG. 3 shows an example of the intervention degree defined as 0% of a block that indicates that cooking is automatically performed without involvement of the user in the multicooker.

The reference is made back to FIG. 1. The recipe database 42 includes storage devices such as an HDD and an SSD. The recipe database 42 stores a program of a recipe created in the development terminal 50.

The log database 43 includes a storage device such as an HDD and an SSD. The log database 43 stores log information transmitted from the device 20.

The development terminal 50 includes a computer such as a laptop computer, a smartphone, or a tablet terminal that is provided with a processor, a memory, and the like. The development terminal 50 acquires multiple blocks stored in the block database 41 via the communication network 90, and creates a program of a recipe using the multiple devices 20 by using the acquired multiple blocks.

The user terminal 30 includes a computer such as a laptop computer, a smartphone, or a tablet terminal that is provided with a processor, a memory, and the like. The user terminal 30 requests the application providing server 10 to provide the program of the recipe created by the development terminal 50 stored in the recipe database 42 via the communication network 90. The user terminal 30 acquires the program of the recipe transmitted by the application providing server 10 in response to the request via the communication network 90, and executes the program of the acquired recipe.

The application providing server 10 includes a computer such as a server or a cloud server that is provided with a processor, a memory, and the like. The application providing server 10 acquires the program of the recipe created in the development terminal 50 via the communication network 90, and stores the acquired program of the recipe in the recipe database 42.

The application providing server 10 acquires the program of the created recipe stored in the recipe database 42 in response to the request for the recipe acquired from the user terminal 30 via the communication network 90, and transmits the acquired program of the created recipe to the user terminal 30. The application providing server 10 further acquires the log information from the device 20 via the communication network 90, and stores the acquired log information in the log database 43.

Figure 4:
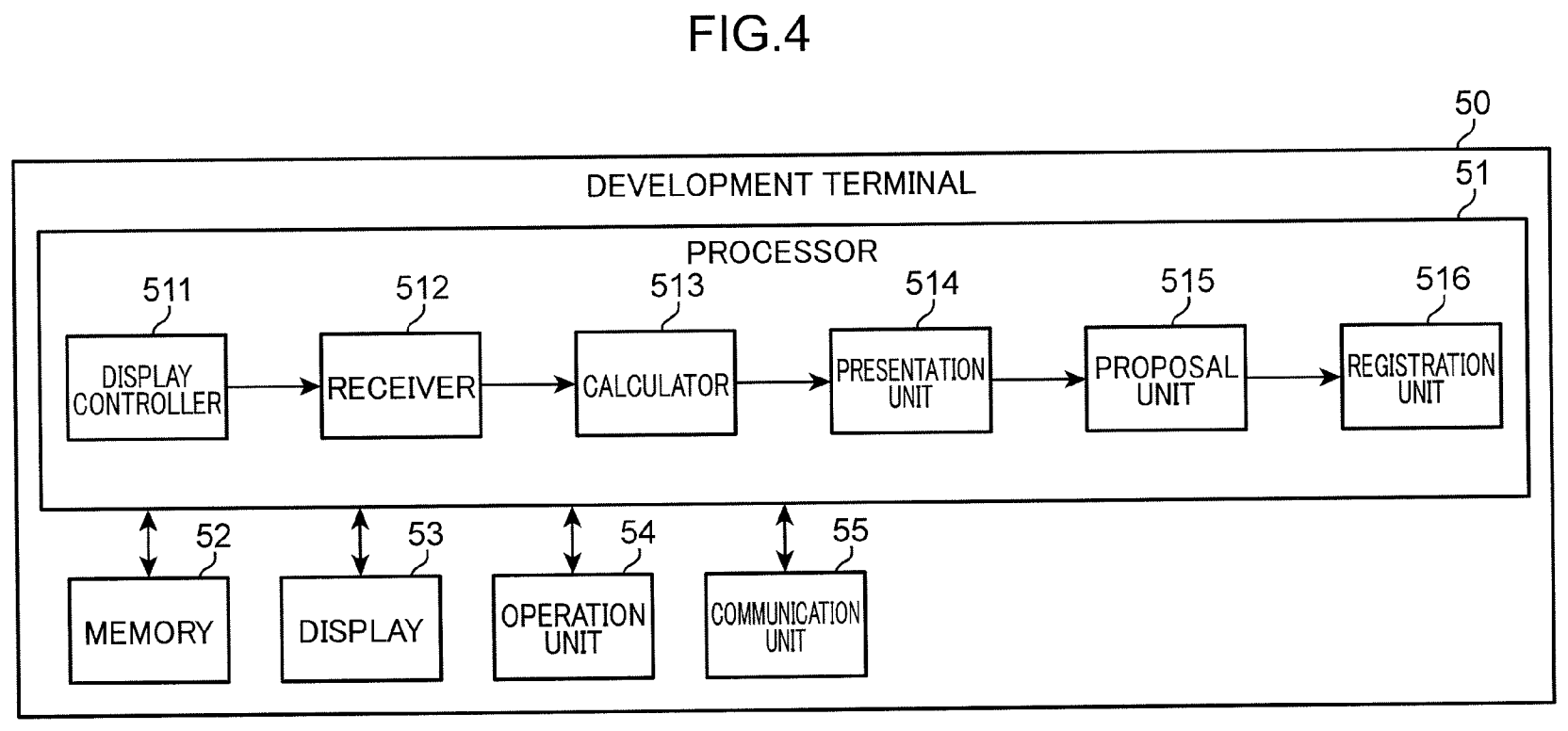

Next, details of the development terminal 50 will be described. FIG. 4 is a block diagram illustrating an example of a functional configuration of the development terminal 50. As illustrated in FIG. 4, the development terminal 50 includes a processor 51, a memory 52, a display 53, an operation unit 54, and a communication unit 55. The processor 51 includes a central processing unit (CPU), for example.

The processor 51 includes a display controller 511 (output controller), a receiver 512, a calculator 513, a presentation unit 514, a proposal unit 515, and a registration unit 516. The display controller 511 to the registration unit 516 are implemented by the processor 51 executing a program for creating a recipe (program), for example.

The memory 52 includes a nonvolatile memory such as a read only memory (ROM) and a volatile memory such as a random access memory (RAM), and stores various types of information used by the processor 51 for control.

The display 53 includes a liquid crystal display, an organic EL display, or the like, and displays various types of information instructed from the processor 51.

The operation unit 54 includes a touch panel or the like, and is used by the user for various operations of the development terminal 50. The communication unit 55 includes a communication circuit compatible with an appropriate communication method such as Ethernet (registered trademark), and communicates with an external device via the communication network 90 (FIG. 1).

Next, details of the display controller 511 to the registration unit 516 will be described.

The display controller 511 causes the display 53 to display a recipe creation screen W1 that is an operation screen for generating a program of a recipe.

Figure 5A:
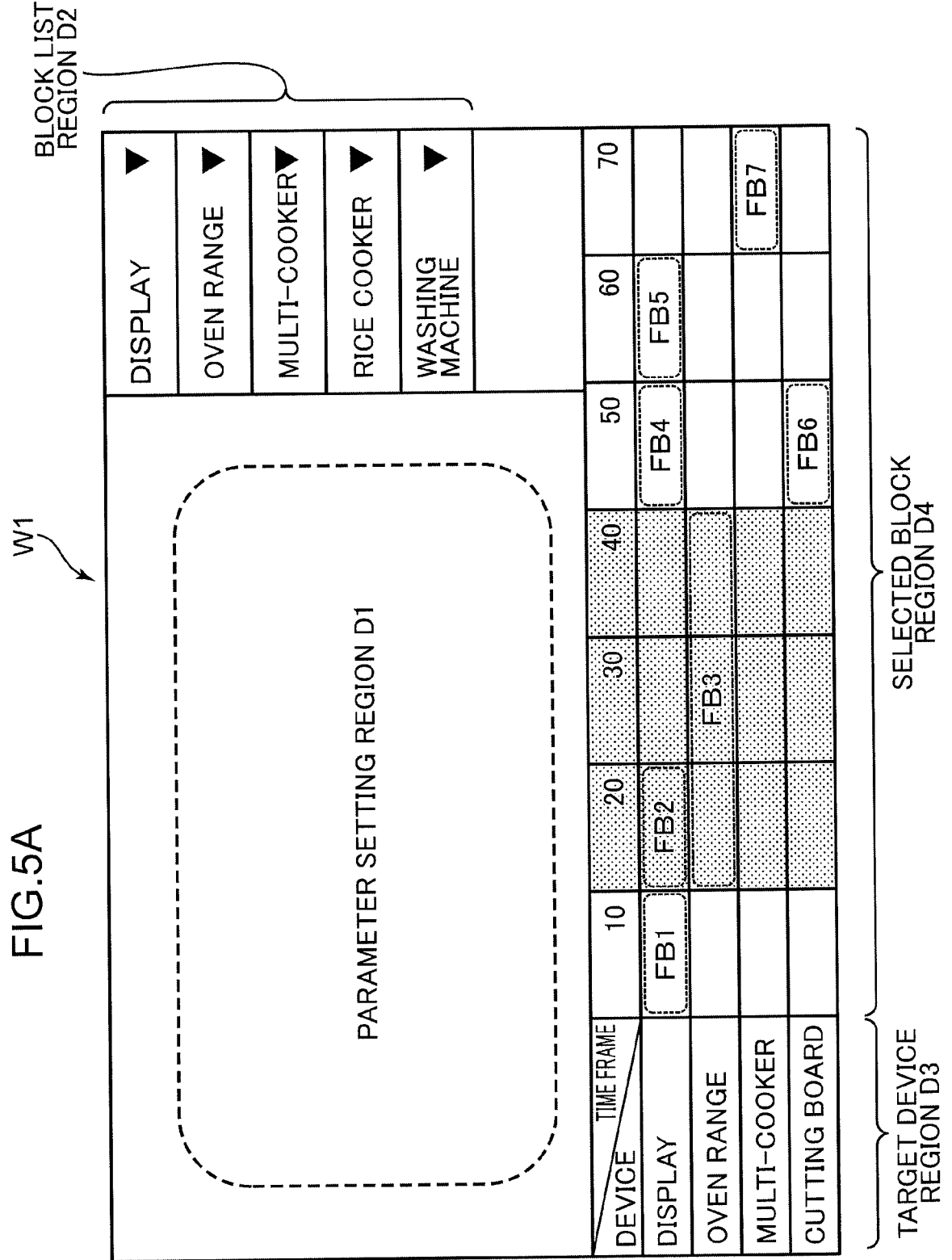
FIG. 5A is a diagram illustrating an example of a recipe creation screen.

FIG. 5A is a diagram illustrating an example of the recipe creation screen W1. Specifically, when a creator performs a predetermined operation using the operation unit 54, the display controller 511 causes the recipe creation screen W1 (first operation screen) as illustrated in FIG. 5A to be displayed. The recipe creation screen W1 includes a block list region D2, a parameter setting region D1, a selected block region D4, and a target device region D3.

The block list region D2 displays one or more list boxes for selecting blocks corresponding to the respective devices 20.

The parameter setting region D1 displays a parameter setting screen for setting parameters of blocks disposed in the selected block region D4 to be described later.

The selected block region D4 displays a block selected and disposed using the one or more list boxes displayed in the block list region D2. The selected block region D4 also displays multiple time frames each of which indicates timing at which operation of the device 20 indicated by the block is performed.

FIG. 5A illustrates an example in which seven time frames for ten minutes are displayed. The following description describes a time frame "X" that is a time frame of ten minutes from a time point when (X–ten) minutes elapses from a start of operation of a control target of a first block to a time point when X minutes elapses from the start of the operation of the control target of the first block.

For example, FIG. 5A illustrates an example in which a block "FB7" of the multi-cooker is disposed in a column of a time frame "70". In this case, operation indicated by the block "FB7" of the multi-cooker is started at timing when 60 minutes elapses after execution of the program of the recipe is started. The time frame has a length that is not limited to ten minutes and that can be set as appropriate.

The target device region D3 displays the devices 20 corresponding to respective blocks disposed in the selected block region D4. FIG. 5A illustrates an example that displays a "multi-cooker" that is the device 20 corresponding to the block "FB7" disposed in the column of the time frame "70".

To display the recipe creation screen W1, the display controller 511 controls the communication unit 55 to acquire multiple blocks stored in the block database 41 via the communication network 90. The display controller 511 classifies the acquired multiple blocks into the corresponding devices 20. The display controller 511 causes the block list region D2 to display one or more list boxes for selecting the blocks corresponding to the respective devices 20.

FIG. 5A illustrates an example that displays a list box for selecting blocks corresponding to the respective devices of the display, the oven range, the multi-cooker, the rice cooker, and the washing machine in the block list region D2.

Figure 5B:
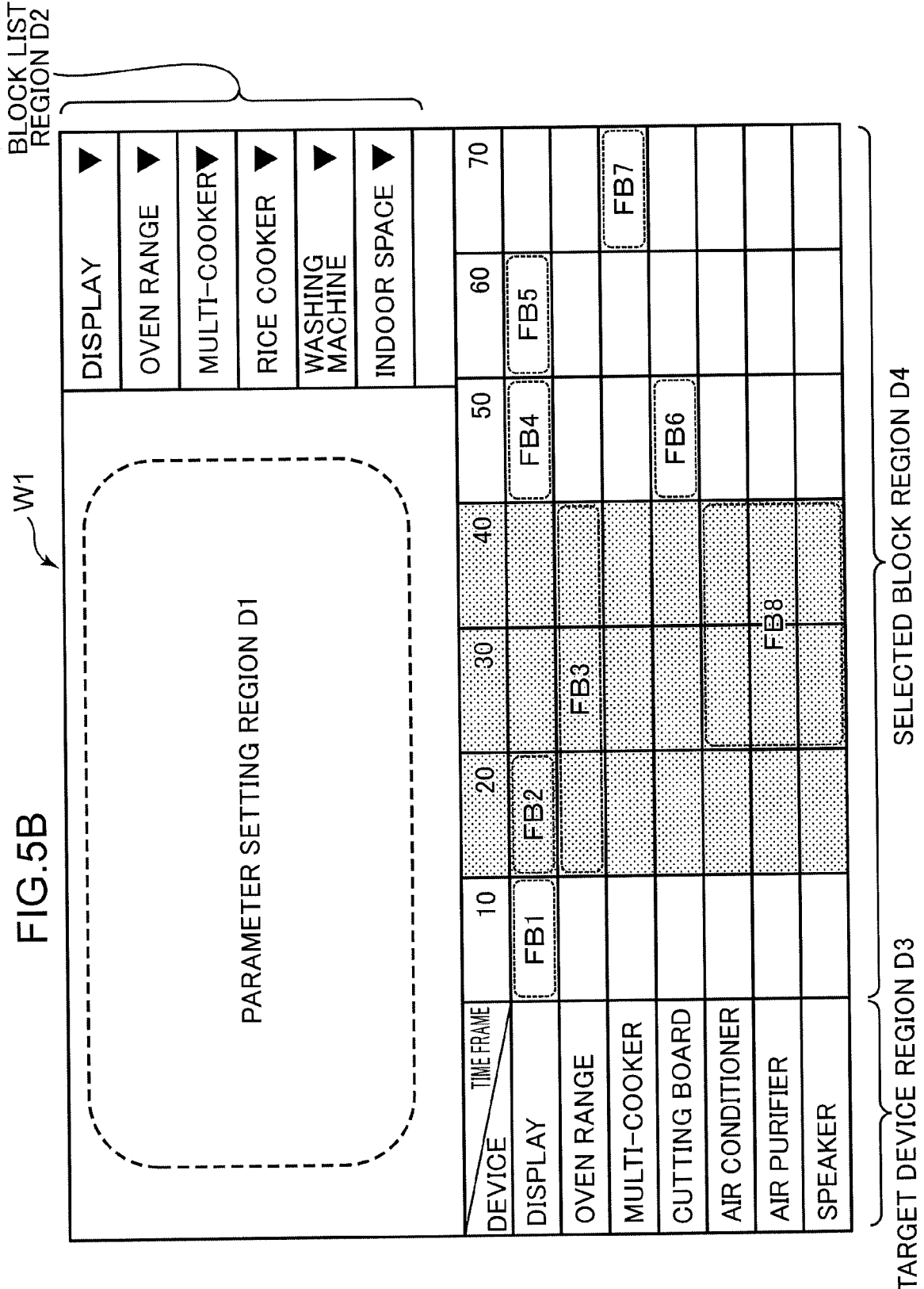
FIG. 5B is a diagram illustrating another example of the recipe creation screen.

The display controller 511 may cause the block list region D2 to display one or more list boxes for selecting a block corresponding to operation performed by multiple devices 20 in conjunction with one another. FIG. 5B is a diagram illustrating another example of the recipe creation screen W1. FIG. SB illustrates an example that displays a list box for selecting a block corresponding to operation related to an indoor space performed by multiple devices 20 in conjunction with one another in the block list region D2.

The receiver 512 receives various operations on the recipe creation screen W1 performed by the creator.

Specifically, the receiver 512 receives an operation of selecting a block for forming a recipe. For details, it is assumed that the creator performs an operation of selecting one block using a list box included in the block list region D2. In this case, the receiver 512 receives the operation of selecting the one block for forming a recipe.

The receiver 512 receives an operation of disposing the block, which is selected by the creator using the list box included in the block list region D2, in a column of any one of time frames provided in the selected block region D4.

Specifically, it is assumed that the creator drags one block selected in the list box included in the block list region D2 onto a column that displays a time frame corresponding to timing when operation of the device 20 indicated by the one block is performed, and drops the one block. In this case, the receiver 512 receives an operation of disposing the one block in the column of the time frame.

The receiver 512 displays an image indicating the block disposed by the received operation on the column that displays the time frame in which the block is disposed. At this time, the receiver 512 adjusts the image indicating the block to have a width equal to that of the time frame in which the block is disposed.

When the device 20 corresponding to the block is not displayed in the target device region D3 at the beginning of a line after the image is displayed in the line, the receiver 512 displays the device 20 corresponding to the block in the target device region D3 at the beginning of the line.

For example, FIG. 5A illustrates an example in which the receiver 512 receives an operation of disposing a block "FB1" of the display in a column of a time frame "10". The operation causes the receiver 512 to display an image indicating the block "FB1" of the display on the column in which the time frame "10" is displayed, and adjust the image to have a width equal to that of the time frame "10". The receiver 512 then displays a "display", which is the device 20 corresponding to the block "FB1", in the target device region D3 at the beginning of a line in which the image is displayed.

The receiver 512 further displays a setting screen of parameters settable to blocks disposed in the selected block region D4 in the parameter setting region D1. The receiver 512 also receives an operation of selecting another block already disposed in the selected block region D4. Also in this case, the receiver 512 displays a setting screen of a parameter settable to the other block selected by the operation in the parameter setting region D1.

The receiver 512 receives an operation of the creator of setting a parameter of each of blocks on the parameter setting screen of each of the blocks displayed in the parameter setting region D1. The parameter of each of the blocks includes duration that is time for continuing operation of the device 20 indicated by the corresponding one of the blocks, and the like. Hereinafter, the duration that is the time for continuing the operation of the device 20 indicated by the corresponding one of the blocks will be abbreviated as duration of each of the blocks. When receiving the operation, the receiver 512 acquires the parameter of each of the blocks set by the operation.

The parameter of each of the blocks may be set in advance by the developer of the device 20. In this case, the receiver 512 displays a preset parameter of each of the blocks as an initial value in a parameter setting field of the corresponding one of the blocks on the parameter setting screen.

The receiver 512 adjusts the width of the image indicating the block displayed in the selected block region D4 in accordance with the duration of the block included in the acquired parameter of the block. In this case, the receiver 512 grasps one or more time frames in which the adjusted image is disposed as a time frame in which the block indicated by the image is disposed.

For example, FIG. 5A illustrates an example in which the receiver 512 receives operations performed by the creator, the operations including an operation of disposing an oven range block "FB3" in a column of a time frame "20", and a next operation of setting duration of the block to 30 minutes. In this case, the receiver 512 displays an image indicating the oven range block "FB3" on the column in which the time frame "20" is displayed, and adjusts the image to have a width corresponding to 30 minutes of the duration of the oven range block "FB3". Then, the receiver 512 determines three time frames "20" to "40", in each of which the adjusted image is disposed, as a time frame in which the oven range block "FB3" is disposed.

It is assumed that the receiver 512 receives an operation of disposing a block corresponding to an operation performed by the multiple devices 20 in conjunction with one another in a column of any one of time frames provided in the selected block region D4. In this case, the receiver 512 displays an image indicating the block on the column that displays the time frame in which the block is disposed. The receiver 512 then adjusts the image indicating the block to have a width equal to that of the time frame in which the block is disposed, and adjusts the image to have a height corresponding to the product of a height of one row in the selected block region D4 and the number of devices 20 corresponding to the block.

For example, FIG. 5B illustrates an example in which the receiver 512 receives operations including an operation performed to dispose a block "FB8" of the air conditioner, the air purifier, and the speaker in a column of a time frame "30", and an operation performed to set duration of the block to 20 minutes. In this case, the receiver 512 displays the image indicating the block "FB8" of the air conditioner, the air purifier, and the speaker on the column where the time frame "30" is displayed.

The receiver 512 adjusts the image to have a width corresponding to 20 minutes which is the duration of the block "FB8", and adjusts the image to have a height corresponding to the product (height for three rows) of a height of one row in the selected block region D4 and the number "3" of the devices 20 corresponding to the block "FB8". Then, the receiver 512 determines the two time frames "30" and "40" in each of which the adjusted image is disposed as a time frame in which the block "FB8" is disposed. The receiver 512 displays an "air conditioner", an "air purifier", and a "speaker", which are three devices 20 corresponding to the block "FB8", in the target device region D3 at the beginning of each of three lines, in each of which the image is displayed.

On the parameter setting screen displayed in the parameter setting region D1, the receiver 512 may change an intervention degree defined in a block, in which a timer condition indicating that operation of a control target is automatically continued for a predetermined time, to an intervention degree reduced by a predetermined degree.

For example, it is assumed that a timer condition for automatically continuing operation of FB7 for 10 minutes is set on the parameter setting screen of the block "FB7" of the multi-cooker with an intervention degree defined as 3, the block "FB7" being disposed in the time frame "70" illustrated in FIG. 5A. In this case, the receiver 512 may change the intervention degree defined in the block "FB7" of the multi-cooker to 2, which is reduced by 1 from 3.

The calculator 513 calculates the sum of intervention degrees of one or more blocks disposed in each of time frames on the recipe creation screen W1. On the recipe creation screen W1, the presentation unit 514 displays (outputs) each of the time frames and information on the sum of intervention degrees calculated by the calculator 513 for each of the time frames in association with each other.

For example, FIG. 5A illustrates an example that shows a block "FB2" of the display having the intervention degree of 0 and duration of 10 minutes, the block "FB2" being disposed in the time frame "20", and a block "FB3" of the oven range having the intervention degree of 0 and duration of 30 minutes, the block "FB3" being disposed in the time frames "20" to "40".

In this case, the calculator 513 calculates the sum of 0 as the sum of intervention degrees of the time frame "20", the sum of 0 being the sum of an intervention degree of 0 of the block "FB2" of the display disposed in the time frame "20" and an intervention degree of 0 of the block "FB3" of the oven range disposed in the time frame "20".

The presentation unit 514 displays the column corresponding to the time frame "20" in the selected block region D4 with a background color of a predetermined color indicating 0, which is the sum of intervention degrees of the time frame "20". This configuration allows the presentation unit 514 to display the time frame "20" and the information on 0, which is the sum of intervention degrees of the time frame "20" in association with each other. That is, in this case, a color corresponding to the sum of intervention degrees serves as the information on the sum of intervention degrees.

Similarly, the calculator 513 calculates the sum of intervention degrees of the time frames "30" and "40", in each of which only one block "FB3" of the oven range having the intervention degree of 0 is disposed, by applying the intervention degree of 0 of the block "FB3" of the oven range, as the sum of intervention degrees of the time frames "30" and "40". The presentation unit 514 displays the columns corresponding to the time frames "30" and "40" with a background color of a predetermined color corresponding to 0, which is the sum of intervention degrees of the time frames "30" and "40".

FIG. 5A further illustrates an example in which the calculator 513 calculates the sum of intervention degrees of one or more blocks disposed in each of the time frames "10", "50", "60", and "70" as 3, and the presentation unit 514 displays columns corresponding to these time frames with a background in white indicating 3, which is the sum of intervention degrees of the time frames.

The method for displaying information on the sum of intervention degrees of each of time frames using the presentation unit 514 is not limited to the above. For example, the presentation unit 514 may display a character string indicating the sum of intervention degrees of each of the time frames calculated by the calculator 513, such as "intervention degree 0", above or below each of the time frames outside the selected block region D4, or may display the character string as a balloon message. That is, in this case, a character string corresponding to the sum of intervention degrees serves as the information on the sum of intervention degrees.

The proposal unit 515 determines a first time frame based on the sum of intervention degrees of each of the time frames. The first time frame is one time frame or multiple consecutive time frames in which a degree of involvement of a user is lower than a reference intervention degree. The proposal unit 515 displays (outputs) proposal information that proposes placement of another one or more blocks for the determined first time frame.

Specifically, the proposal unit 515 determines one time frame or multiple consecutive time frames having the sum of intervention degrees lower than a predetermined threshold as the first time frame.

For example, it is assumed that the predetermined threshold is set to 2. As shown in the example of FIG. 5A, a calculated sum of intervention degrees of the time frames "20", "30", and "40" is assumed to be 0, and a calculated sum of intervention degrees of the time frames "10", "50", "60", and "70" is assumed to be 3. In this case, the proposal unit 515 determines three consecutive time frames "20" to "40" having the sum of intervention degrees lower than the predetermined threshold of 2 as the first time frame.

Figure 6:
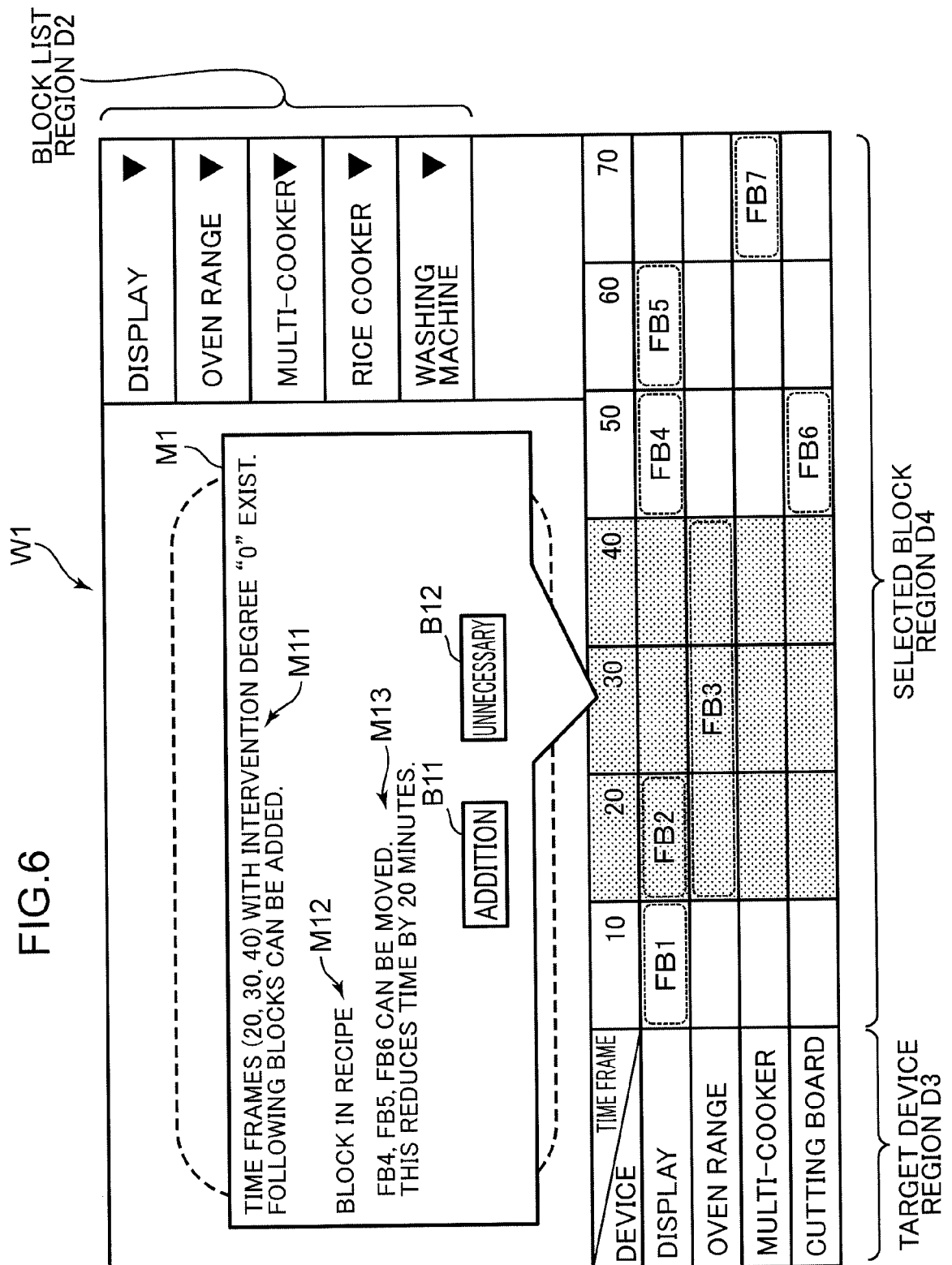
FIG. 6 is a diagram illustrating an example of a recipe creation screen on which proposal information is displayed.

FIG. 6 is a diagram illustrating an example of the recipe creation screen W1 on which proposal information M1 is displayed. As illustrated in FIG. 6, the proposal unit 515 then displays the proposal information M1 that proposes placement of another one or more blocks in association with the three consecutive time frames "20" to "40" determined as the first time frame, as a balloon message. The method for displaying the proposal information M1 using the proposal unit 515 is not limited to the above. For example, the proposal unit 515 may display the proposal information M1 as a modal window.

As illustrated in FIG. 6, the proposal information M1 specifically includes first detailed information M11, second detailed information M12, and third detailed information M13. The first detailed information M11 is for identifying the first time frame. The second detailed information M12 indicates that another one or more blocks can be disposed in the first time frame. The third detailed information M13 indicates an effect obtained by setting the other one or more blocks in the first time frame. A method for generating the first detailed information M11, the second detailed information M12, and the third detailed information M13 will be described later.

The proposal information M1 includes a first button B11 for performing an operation of accepting contents of a proposal indicated by the proposal information M1 and a second button B12 for performing an operation of not accepting the contents of the proposal.

When the creator presses the first button B11 using the operation unit 54, the proposal unit 515 disposes the other one or more blocks within the first time frame as indicated by the second detailed information M12, and hides the proposal information M1.

Figure 7:
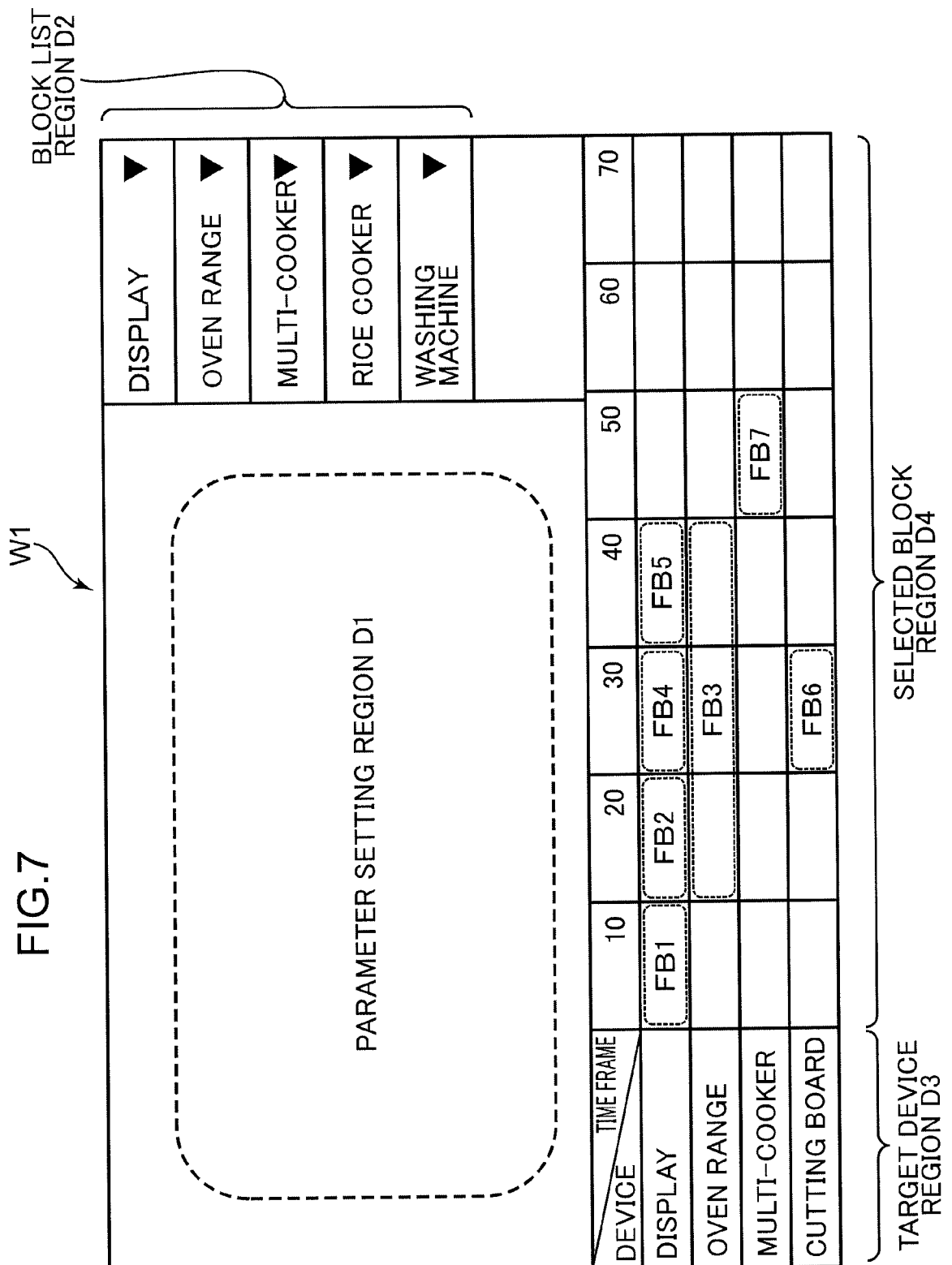
FIG. 7 is a diagram illustrating an example of a recipe creation screen reflecting proposal contents.

FIG. 7 is a diagram illustrating an example of the recipe creation screen W1 reflecting proposal contents. For example, it is assumed that the first button B11 is pressed on the recipe creation screen W1 illustrated in FIG. 6. In this case, as illustrated in FIG. 7, the proposal unit 515 disposes two blocks "FB4" and "FB5" of the display and one block "FB6" of a cutting board in the corresponding time frames "30" and "40" as indicated by the second detailed information M12 (FIG. 6) included in the proposal information M1.

In this case, the two blocks "FB4" and "FB5" of the display and one block "FB6" are moved, so that no block is disposed in the two time frames "50" and "60".

As described above, when one or more time frames have no block disposed by reflecting the proposal contents indicated by the proposal information M1, the proposal unit 515 disposes blocks disposed in time frames subsequent to the one or more time frames, in time frames before these time frames by one or more time frames.

In the present example, the proposal unit 515 disposes the block "FB7" of the multi-cooker disposed in the time frame "70" subsequent to the two time frames "50" and "60", in the time frame "50", which is before the time frame "70" by two time frames. This placement achieves reduction of 20 minutes in time required to perform all operations indicated by seven blocks constituting a program of a recipe created by the creator.

The calculator 513 then recalculates the sum of intervention degrees of each time period after the proposal contents are reflected, and the presentation unit 514 displays each of time frames and the sum of intervention degrees of the corresponding one of time frames recalculated by the calculator 513 in association with each other. In the present example, the sum of intervention degrees of the time frames "20", "30", and "40" is recalculated as 3, and the time frames "20", "30", and "40" are displayed with a background color of white indicating 3, which is the sum of intervention degrees of the time frames.

In contrast, when the creator presses the second button B12 using the operation unit 54, the proposal unit 515 hides the proposal information M1.

The registration unit 516 registers the program of the recipe created on the recipe creation screen W1 in the recipe database 42.

Specifically, it is assumed that the creator performs an operation of pressing a completion button (not illustrated) provided on the recipe creation screen W1. In this case, the registration unit 516 assumes that the creator has performed an operation for requesting registration of the recipe created on the recipe creation screen W1 to the recipe database 42, and receives the operation.

Upon receiving the operation, the registration unit 516 starts the operation of the device 20 indicated by each of the multiple blocks disposed in the selected block region D4 at timing indicated by a time frame in which each of the blocks is disposed using a parameter of the corresponding one of the blocks, and generates a program that continues the operation for duration included in the parameter.

Then, the registration unit 516 causes the communication unit 55 to transmit the generated program to the application providing server 10 as the program of the recipe created by the creator together with information that requests registration of the recipe. The application providing server 10 accordingly acquires the information that requests the registration of the recipe from the development terminal 50 via the communication network 90, and then stores the program of the recipe acquired together with the information in the recipe database 42.

Figure 8:
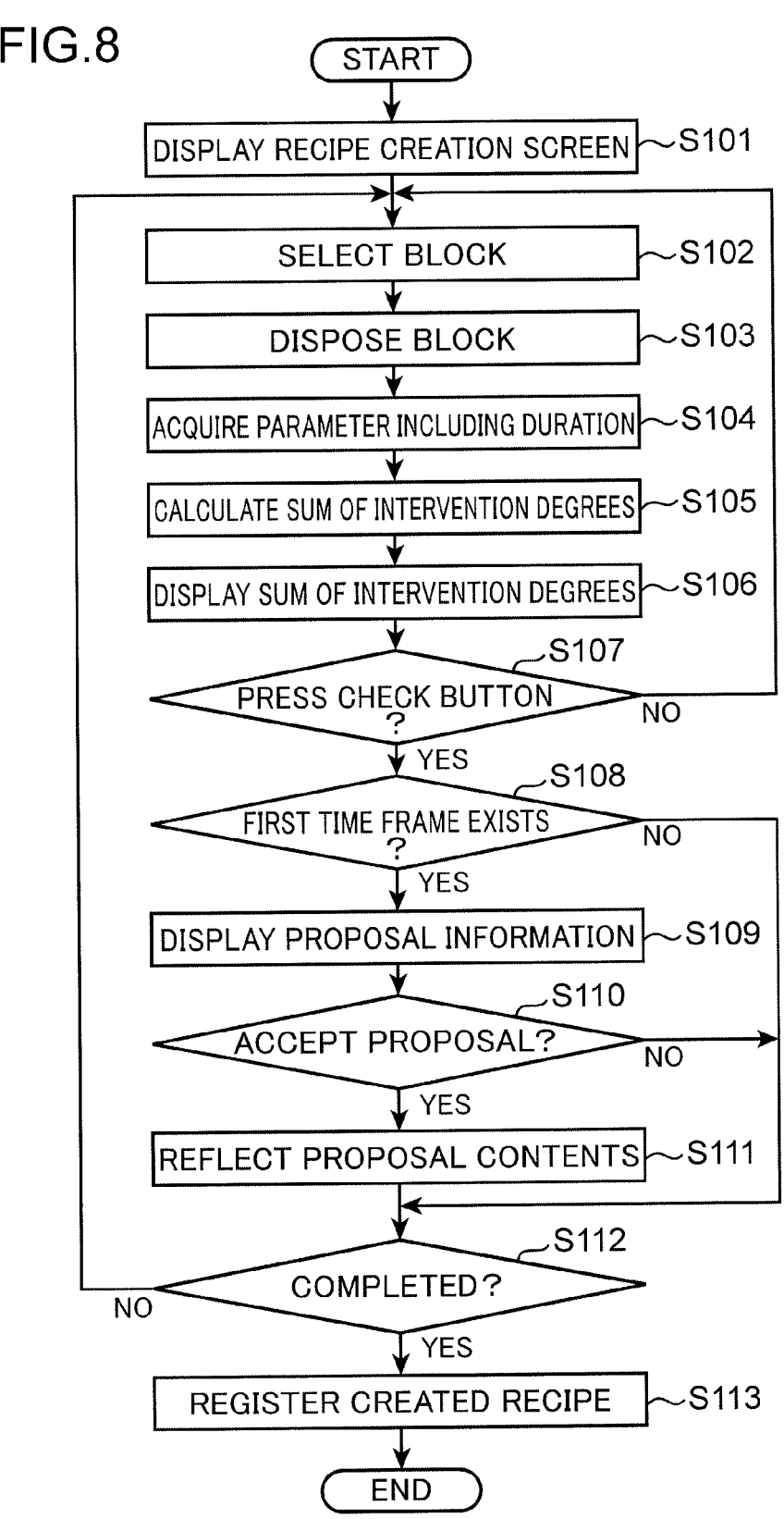
FIG. 8 is a flowchart illustrating an example of recipe creation processing.

Next, a flow of recipe creation processing in the development terminal 50 will be described. FIG. 8 is a flowchart illustrating an example of the recipe creation processing.

When the creator performs a predetermined operation using the operation unit 54, the display controller 511 causes the display 53 to display the recipe creation screen W1 in step S101. This operation starts the recipe creation processing illustrated in FIG. 8.

Next, in step S102, the receiver 512 receives an operation of the creator to select a block constituting a recipe on the recipe creation screen W1.

In step S103, the receiver 512 receives an operation of the creator to dispose the block selected in step S102 in a column of any one of multiple time frames.

In step S104, the receiver 512 displays the parameter setting screen of the block disposed in step S103 in the parameter setting region D1. The receiver 512 acquires parameters of the block, including duration of the block and being set on the setting screen.

In step S105, the calculator 513 calculates the sum of intervention degrees of each of time periods. In step S104, it is assumed that the receiver 512 determines that the block is disposed in two time frames because the duration included in the parameter of the block is 20 minutes. In this case, the two respective time frames and the sum of intervention degrees of one or more blocks disposed in the two respective time frames are calculated in step S105.

In step S106, the presentation unit 514 displays each of the time frames in which the block is disposed in step S103 and information on the sum of intervention degrees of the corresponding one of the time frames calculated in step S105 in association with each other.

When the creator has not pressed a check button (not illustrated) provided on the recipe creation screen W1 in step S107 (NO in step S107), processing in and after step S102 is repeated. As a result, blocks constituting the recipe are disposed one by one in a column of any one of the multiple time frames.

In contrast, it is assumed that the creator presses the check button (not illustrated) provided on the recipe creation screen W1 in step S107. In this case (YES in step S107), the proposal unit 515 determines a first time frame in which a degree of involvement of a user is lower than a reference intervention degree based on the sum of intervention degrees of each of the time frames in step S108.

When the first time frame is determined in step S108 (YES in step S108), the proposal unit 515 displays the proposal information M1 that proposes to dispose another one or more blocks for the first time frame in association with the first time frame in step S109.

In subsequent step S110, it is assumed that the creator presses the first button B11 included in the proposal information M1 displayed in step S109. In this case (YES in step S110), the proposal unit 515 reflects proposal contents indicated by the proposal information M1 in step S111.

Specifically, the proposal unit 515 disposes the other one or more blocks within the first time frame determined in step S108 as indicated by the second detailed information M12 included in the proposal information M1 and hides the proposal information M1 in step S11. The calculator 513 then recalculates the sum of intervention degrees of each of time periods, and the presentation unit 514 displays each of time frames and information on the sum of intervention degrees of the corresponding one of the time frames recalculated by the calculator 513 in association with each other.

When the first time frame is not determined in step S108 (NO in step S108), the processing proceeds to step S112. In step S110, when the creator presses the second button B12 included in the proposal information M1 displayed in step S109 (NO in step S110), the processing also proceeds to step S112.

In step S112, the processing branches depending on whether the completion button (not illustrated) provided on the recipe creation screen W1 is pressed by the creator. Specifically, when the completion button (not illustrated) provided on the recipe creation screen W1 is pressed by the creator (YES in step S112), step S113 is performed. In step S113, the registration unit 516 registers a program of the recipe created on the recipe creation screen W1 in the recipe database 42. In contrast, while the completion button (not illustrated) provided on the recipe creation screen W1 is not pressed by the creator (NO in step S112), the processing in and after step S102 is performed.

Next, a method for creating the proposal information M1 with the proposal unit 515 will be described. FIG. 9 is a diagram illustrating an example of a recipe R1 created by the creator. Hereinafter, an example of creating the proposal information M1 with the proposal unit 515 will be described in which the creator presses the check button (not illustrated) provided on the recipe creation screen W1 after creating the recipe R1 illustrated in FIG. 9 using the recipe creation screen W1.

The recipe R1 illustrated in FIG. 9 includes eleven blocks. The eleven blocks include three blocks "preparation", "mixing", and "serving" of the display, the block "baking" of the oven range, and two blocks "weighing" and "cutting" of the cutting board with a scaler, these blocks each having an intervention degree of 3. Other blocks each have an intervention degree of 0.

Thus, the presentation unit 514 displays a character string, "intervention degree 3", indicating that the sum of intervention degrees calculated by the calculator 513 for the respective time frames "10" to "20", "60" to "80", and "110" is 3, in association with each of the time frames. The presentation unit 514 also displays a character string, "intervention degree 0", indicating that the sum of intervention degrees of respective other time frames "30" to "50", and "90" to "100" is 0, in association with each of the time frames.

The block "baking" of the display disposed in the time frame "20" is set as a combined block to be used in combination at a start of operation indicated by the block on a setting screen of a parameter of the block "baking" of the oven range.

Similarly, the blocks "weighing", "cutting", and "boiling" of the display disposed in the time frames "60", "70", and "90", respectively, are each set as a combined block on a setting screen of parameters of the blocks "weighing" and "cutting" of the cutting board and the block "boiling" of the multi-cooker.

On a setting screen of a parameter of the block "serving" of the display, the block is set as a last block in the recipe that cannot be disposed in parallel with other blocks.

In this case, the proposal unit 515 determines the first time frame and another one or more blocks that can be disposed in the first time frame by using a movement determination table RT0 stored in advance in the memory 52 (FIG. 4). Hereinafter, the one or more blocks that can be disposed in the first time frame will be referred to as one or more candidate blocks.

FIG. 10 is a diagram illustrating an example of the movement determination table RT0. The memory 52 (FIG. 4) preliminarily stores the movement determination table RT0 illustrated in FIG. 10. As illustrated in FIG. 10, the movement determination table RT0 defines a relationship among a first intervention degree condition, a second intervention degree condition, and a time condition. The first intervention degree condition is to be satisfied by the sum of intervention degrees of the first time frame to move one or more blocks in the recipe to the first time frame. The second intervention degree condition is to be satisfied by an intervention degree of the one or more blocks in the recipe. The time condition is based on a length of the first time frame and is to be satisfied by duration of the one or more blocks.

For example, the movement determination table RT0 illustrated in FIG. 10 shows the first intervention degree condition indicating that the sum of intervention degrees of the first time frame is 0, the second intervention degree condition indicating that the intervention degree of one or more blocks in the recipe is 3, and the time condition indicating that the duration of the one or more blocks is 5 minutes or more and is equal to or less than the first time frame, in association with one another. This indicates that, in the first time frame indicating that the sum of intervention degrees is 0, one or more blocks having an intervention degree of 3 and a duration of 5 minutes or more and equal to or less than the first time frame among multiple blocks in the recipe can be disposed.

In the movement determination table RT0 illustrated in FIG. 10, the second intervention degree condition and the time condition are not associated with the first intervention degree condition indicating that the sum of intervention degrees of the first time frame is 2 or more. This indicates that one time frame or multiple consecutive time frames having the sum of intervention degrees of 2 or more are not determined as the first time frame, because a threshold for determining the first time frame is set to 1.

That is, the proposal unit 515 determines, as the first time frame, one time frame or multiple consecutive time frames that satisfy the first intervention degree condition associated with the second intervention degree condition and the time condition in the movement determination table RT0, and that have the sum of intervention degrees of 1 or less.

The movement determination table RT0 illustrated in FIG. 10 is defined such that the sum of intervention degrees indicated by the first intervention degree condition and the intervention degree indicated by the second intervention degree condition corresponding to the first intervention degree condition is 3 or less. Thus, the proposal unit 515 can propose one or more blocks in the recipe that are operable within the first time frame while satisfying a condition that the sum of intervention degrees in the first time frame does not exceed 3. This configuration enables a worker to dispose the proposed one or more blocks in the first time frame accordingly to limit the sum of intervention degrees of respective time frames to 3 or less, thus enabling creation of a recipe that can be efficiently worked by the user with a required time shortened.

In the present example, among the eleven time frames "10" to "110" in the recipe R1 illustrated in FIG. 9, the proposal unit 515 determines, as the first time frame, each of the time frames "30" to "50", and "90" to "100", having the sum of intervention degrees of 0 that is smaller than the threshold.

The proposal unit 515 generates information that can identify the first time frame as the first detailed information M11 included in the proposal information M1. In the present example, the proposal unit 515 generates a character string, "Time frames with low intervention degree (30 to 50, 90 to 100) exist. Following blocks can be added", as the first detailed information M11, for example.

When the first time frame can be determined, the proposal unit 515 determines one or more candidate blocks that can be disposed in the first time frame based on the movement determination table RT0 of FIG. 10, a length of the first time frame, and one or more devices 20 corresponding to one or more respective blocks disposed in the first time frame.

In the present example, the proposal unit 515 grasps that one or more blocks among the multiple blocks in the recipe R1 can be disposed in the first time frame "30" having the sum of intervention degrees of 0, the one or more blocks having an intervention degree of any of 1 to 3, a duration of 5 minutes or more, and a length equal to or less than that of the first time frame "30", by referring to the movement determination table RT0.

Next, the proposal unit 515 refers to one or more blocks disposed in a time frame after the first time frame "30", the one or more blocks having a duration equal to or less than the length (10 minutes) of the first time frame "30" among one or more blocks having an intervention degree of any one of 1 to 3 and a duration of 5 minutes or more. In the present example, the one or more blocks referred to are the blocks "mixing" and "serving" of the display and the two blocks of "weighing" and "cutting" of the cutting board with a scaler.

Subsequently, among the one or more blocks referred to, the proposal unit 515 refers to one or more blocks corresponding to a device 20 different from the device 20 that is the "oven range" corresponding to the block "baking" of the oven range disposed in the first time frame "30". In the present example, the one or more blocks referred to are the blocks "mixing" and "serving" of the display and the two blocks of "weighing" and "cutting" of the cutting board with a scaler.

Then, among the one or more blocks referred to, the proposal unit 515 determines, as the one or more candidate blocks, one or more blocks disposed in a time frame closest to the first time frame "30", for example. In the present example, the proposal unit 515 determines the block "weighing" of the cutting board disposed in the time frame "60" closest to the first time frame "30" as a candidate block that can be disposed in the first time frame "30".

However, a method for determining one or more candidate blocks from one or more blocks referred to, with the proposal unit 515, is not limited to the above. For example, among the one or more blocks referred to, the proposal unit 515 may determine, as the one or more candidate blocks, one or more blocks having a duration closest to the length of the first time frame "30".

As described above, the block "weighing" of the display is set as a combined block to be used together at a start of weighing operation of the cutting board indicated by the block on a setting screen of a parameter of the block "weighing" of the cutting board. Thus, the proposal unit 515 determines two blocks of the block "weighing" of the cutting board and the block "weighing" of the display as candidate blocks that can be disposed in the first time frame "30".

The proposal unit 515 excludes the block already determined as the candidate block from the multiple blocks in the recipe R1, and similarly to the above, determines two blocks of the block "cutting" of the cutting board and the block "cutting" of the display as one or more candidate blocks that can be disposed in the first time frame "40". The proposal unit 515 also determines the block "mixing" of the display as one or more candidate blocks that can be disposed in the first time frame "50".

The block "serving" of the display disposed in the time frame "110" is set as the last block that cannot be disposed in parallel with other blocks. Thus, the proposal unit 515 does not determine the block "serving" of the display as one or more candidate blocks that can be disposed in the first time frame "100".

The proposal unit 515 generates information indicating that the one or more determined candidate blocks in the recipe R1 are movable as the second detailed information M12 included in the proposal information M1. In the present example, the proposal unit 515 generates a character string, "Blocks (weighing, cutting, mixing) in the recipe can be moved", for example, as the second detailed information M12.

The proposal unit 515 generates information indicating an effect obtained when the one or more determined candidate blocks are disposed in the first time frame, such as the effect indicated by the generated second detailed information M12, as the third detailed information M13 included in the proposal information M1.

FIG. 11 is a diagram illustrating an example of a recipe R11 reflecting the proposal contents. In the present example, when the proposal unit 515 moves five candidate blocks to the first time frame "30" to "50" as indicated by the generated second detailed information M12, the three time frames "60" to "80" come to a state where no block is disposed.

Thus, as illustrated in FIG. 11, the proposal unit 515 moves one or more blocks disposed in the three time frames "90" to "110", subsequent to the three time frames "60" to "80" in the state where no block is disposed, to previous time frames by a length of the three time frames "60" to "80".

Specifically, the proposal unit 515 moves the one or more blocks disposed in the three time frames "90" to "110" to the three corresponding time frames "60" to "80" that are respectively 30 minutes before the three time frames "90" to "110". After the movement, the calculator 513 recalculates the sum of intervention degrees of each of the time frames, and the presentation unit 514 displays information on the recalculated sum of intervention degrees of each of the time frames. In this case, an effect is obtained in which time required to execute the recipe R1 is reduced by 30 minutes as compared with the recipe R1 created by the creator.

The proposal unit 515 generates information indicating the effect as the third detailed information M13 included in the proposal information M1. In the present example, the proposal unit 515 generates a character string, "This reduces time by 30 minutes", for example, as the third detailed information M13.

As described above, the first embodiment enables the creator to visually recognize the sum of intervention degrees of each of time frames. Thus, the creator can dispose the multiple blocks in columns of the appropriate time frames in consideration of the degree of involvement of a user in each of the time frames. As a result, the creator can create an application for controlling the multiple devices 20, the application being user-friendly and comfortable.

Additionally, the creator can easily move the other one or more blocks disposed in a time frame different from the first time frame to the first time frame according to the contents of the proposal indicated by the proposal information M1. As a result, the creator can reduce time required for executing the application to be created.

Second Embodiment

In the first embodiment, an example has been described in which the proposal unit 515 displays the proposal information M1 indicating that one or more blocks in the recipe R1 created by the creator is proposed as one or more candidate blocks. In a second embodiment, a proposal unit 515 displays proposal information M1 indicating that one or more blocks constituting a program of a created recipe stored in a recipe database 42 is proposed as one or more candidate blocks.

Hereinafter, a method for creating the proposal information M1 with the proposal unit 515 in the second embodiment will be described. Hereinafter, an example of creating the proposal information M1 with the proposal unit 515 will be described in which a creator presses a check button (not illustrated) provided on a recipe creation screen W1 after creating a recipe R1 as in the first embodiment illustrated in FIG. 9 using a recipe creation screen W1.

In the second embodiment, the proposal unit 515 determines a first time frame and one or more candidate blocks by using a first rule table RT1 (first table) stored in advance in a memory 52 (FIG. 4).

FIG. 12 is a diagram illustrating an example of the first rule table RT1. The memory 52 (FIG. 4) preliminarily stores the first rule table RT1 illustrated in FIG. 12. As illustrated in FIG. 12, the first rule table RT1 defines a relationship among an intervention degree condition, a time condition, and a program of an existing recipe stored in the recipe database 42. The intervention degree condition is to be satisfied by the sum of intervention degrees of the first time frame to dispose the program of the existing recipe created and stored in the recipe database 42 in the first time frame. The time condition is to be satisfied by a length of the first time frame.

For example, the first rule table RT1 illustrated in FIG. 12 shows the intervention degree condition indicating that the sum of intervention degrees of the first time frame is 0, the time condition indicating that the first time frame has a length corresponding to time for which a program of a recipe of 10 minutes or less can be executed, and a program of a recipe for making an omelet, in association with one another. This indicates that one or more blocks constituting the program of the recipe for making an omelet can be disposed in the first time frame having the sum of intervention degrees of 0 and a length corresponding to 10 minutes or more.

In the first rule table RT1 illustrated in FIG. 12, a time condition and a program of an existing recipe are not associated with the intervention degree condition indicating that the sum of intervention degrees is 2 or more. This indicates that one time frame or multiple consecutive time frames having the sum of intervention degrees of 2 or more are not determined as the first time frame, because a threshold for determining the first time frame is set to 1.

That is, in the second embodiment, the proposal unit 515 determines one time frame or multiple consecutive time frames having the sum of intervention degrees of 1 or less and satisfying the intervention degree condition that is associated with the time condition and the program of the existing recipe in the first rule table RT1 as a first time frame in which an intervention degree of a user is lower than a reference intervention degree. The second embodiment also causes the proposal unit 515 to treat a first time frame, which includes multiple consecutive time frames having the sum of intervention degrees of 1 or less, as one first time frame.

In the present example, the proposal unit 515 determines three consecutive time frames "30" to "50" having the sum of intervention degrees of 0 as a primary first time frame, among eleven time frames "10" to "110" in the recipe R1 illustrated in FIG. 9. The proposal unit 515 also determines two consecutive time frames "90" to "100" having the sum of intervention degrees of 0 as a secondary first time frame.

As in the first embodiment, the proposal unit 515 generates information that can identify the determined first time frame as the first detailed information M11 included in the proposal information M1. In the present example, the proposal unit 515 generates a character string, "Time frames with low intervention degree (30 to 50, 90 to 100) exist. Following blocks can be added", as the first detailed information M11, for example.

When the first time frame can be determined, the proposal unit 515 determines one or more candidate blocks that can be disposed in the first time frame based on the first rule table RT1 and one or more devices 20 used by one or more blocks disposed in the first time frame.

Specifically, in the first rule table RT1, the proposal unit 515 first grasps that the program of the existing recipe corresponding to the intervention degree condition satisfied by the sum of intervention degrees of the first time frame and the time condition satisfied by the length of the first time frame can be disposed in the first time frame.

In the present example, the proposal unit 515 grasps that, in the first rule table RT1, programs of a recipe for making butter and a recipe for making an omelet can be disposed in the primary first time frame "30" to "50", the programs corresponding to the intervention degree condition indicating that the sum of intervention degrees is 0 and the time condition having time that enables executing programs of recipes for 30 minutes or less and 10 minutes or less to be executed, which are satisfied by the primary first time frame "30" to "50".

The proposal unit 515 also grasps that, in the first rule table RT1, the program of the recipe for making an omelet can be disposed in the secondary first time frame "90" to "100", the program corresponding to the intervention degree condition indicating that the sum of intervention degrees is 0 and the time condition having time that enables executing a program of a recipe for 10 minutes or less, which are satisfied by the secondary first time frame "90" to "100".

Thus, the proposal unit 515 controls a communication unit 55 to request an application providing server 10 to transmit the programs of the recipe for making butter and the recipe for making an omelet, thereby acquiring the programs.

Next, the proposal unit 515 determines whether the acquired program of the existing recipe includes a block using a device 20 included in one or more devices 20 used in the first time frame.

In the present example, the recipe for making butter includes blocks "weighing" and "frying" of a display, a block "weighing" of a cutting board with a scaler, and a block "frying" of a multi-cooker. The recipe for making an omelet includes a block "baking" of a display and a block "baking" of an IH cooking heater. On a setting screen of a parameter of the block "baking" of the IH cooking heater, the block "baking" of the display is set as a combined block.

Thus, the proposal unit 515 in the present example determines that the programs of the recipe for making butter and the recipe for making an omelet do not include a block using the oven range used in the primary first time frame "30" to "50". In contrast, the proposal unit 515 determines that the program of the recipe for making an omelet includes a block using a display used in the secondary first time frame "90" to "100".

It is assumed that the proposal unit 515 determines that the program of the acquired existing recipe does not include a block using a device 20 included in the one or more devices 20 used in the first time frame. In this case, the proposal unit 515 determines one or more blocks constituting the program of the existing recipe as one or more candidate blocks that can be disposed in the first time frame.

Alternatively, it is assumed that the proposal unit 515 determines that the program of the acquired existing recipe includes a block using a device 20 included in the one or more devices 20 used in the first time frame. In this case, the proposal unit 515 determines that one or more candidate blocks that can be disposed in the first time frame does not exist.

The proposal unit 515 in the present example determines one or more blocks as one or more candidate blocks that can be disposed in the primary first time frame, the one or more blocks constituting the programs of the recipe for making butter and the recipe for making an omelet, the programs including no block using the oven range used in the primary first time frame "30" to "50".

In contrast, the proposal unit 515 does not determine one or more candidate blocks that can be disposed in the secondary first time frame because the program of the recipe for making an omelet includes a block that uses the display used in the secondary first time frame "90" to "100".

When determining one or more candidate blocks constituting the program of the existing recipe that can be disposed in the first time frame, the proposal unit 515 generates information as the second detailed information M12 included in the proposal information M1, the information indicating that a block of the program of the existing recipe that falls within the first time frame can be inserted. In the present example, the proposal unit 515 generates a character string, "Block of existing recipe, indicating that recipe can be made in 30 minutes, is insertable", for example, as the second detailed information M12.

The proposal unit 515 generates information indicating an effect obtained when the block of the program of the existing recipe that falls within the first time frame is inserted as indicated by the generated second detailed information M12, as third detailed information M13 included in the proposal information M1. In the present example, the proposal unit 515 generates a character string, "Butter or omelet can be further made", for example, as the third detailed information M13.

To determine one or more candidate blocks from programs of multiple existing recipes as in the present example, the proposal unit 515 displays an operation screen for selecting any one of the programs of multiple existing recipes when a first button B11 is pressed, for example. Then, the proposal unit 515 disposes one or more blocks constituting the program of the existing recipe selected on the operation screen within the first time frame.

For example, it is assumed that a program of a recipe for making butter is selected on the operation screen in the present example. It is also assumed that the program of the recipe for making butter has a time frame of first 10 minutes in which the blocks "weighing" of the display and the cutting board are disposed, and a time frame of next 10 minutes in which the block "frying" of the display and the block "frying" of the multi-cooker having a duration of 20 minutes are disposed.

FIG. 13 is a diagram illustrating an example of a recipe R12 reflecting another proposal contents. In this case, as illustrated in FIG. 13, the proposal unit 515 disposes four blocks constituting the program of the recipe for making butter in the primary first time frame "30 to 50" in columns of respective time frames of a selected block region D4, the columns corresponding to the time frames disposed in the program of the recipe. After that, a calculator 513 recalculates the sum of intervention degrees of each of the time frames, and a presentation unit 514 displays information on the recalculated sum of intervention degrees of each of the time frames.

When the proposal unit 515 determines one or more blocks constituting the programs of the multiple existing recipes as one or more candidate blocks, the programs of multiple existing recipes may be limited to a program of one existing recipe by a predetermined method.

Examples of the predetermined method include a method for storing a program of a recipe in the recipe database 42 in association with priority, and limiting the program of the recipe to a program of an existing recipe associated with the highest priority, for example. The examples of the predetermined method also include a method for random limit to one existing recipe. The examples of the predetermined method further include a method for storing a use history of a program of a recipe in the recipe database 42 and limiting a program of a recipe to the program of the recipe having the highest use frequency in the use history.

As described above, the second embodiment enables a creator to create an efficient program of a recipe that enables a user to execute a program of another recipe in a time frame in which a degree of involvement of a user is lower than a reference intervention degree.

Third Embodiment

In a third embodiment, an example will be described in which a proposal unit 515 displays proposal information M1 indicating that one or more blocks representing abstracted presentation of advertisement information is proposed as one or more candidate blocks.

Hereinafter, a method for creating the proposal information M1 with the proposal unit 515 in the third embodiment will be described. Hereinafter, an example of creating the proposal information M1 with the proposal unit 515 will be described in which a creator presses a check button (not illustrated) provided on a recipe creation screen W1 after creating a recipe R1 as in the first embodiment illustrated in FIG. 9 using a recipe creation screen W1.

In the third embodiment, the proposal unit 515 determines a first time frame and one or more candidate blocks by using a second rule table RT2 (second table) stored in advance in a memory 52 (FIG. 4).

FIG. 14 is a diagram illustrating an example of the second rule table RT2. The memory 52 (FIG. 4) preliminarily stores the second rule table RT2 illustrated in FIG. 14. As illustrated in FIG. 14, the second rule table RT2 defines a relationship among an intervention degree condition, a time condition, and one or more blocks representing abstracted presentation of advertisement information. The intervention degree condition is to be satisfied by the sum of intervention degrees of the first time frame to dispose each of the one or more blocks representing the abstracted presentation of the advertisement information in the first time frame. The time condition is to be satisfied by a length of the first time frame. Hereinafter, a block representing abstracted presentation of advertisement information is referred to as an advertisement block.

For example, the second rule table RT2 illustrated in FIG. 14 shows the intervention degree condition indicating that the sum of intervention degrees of the first time frame is 0, the time condition indicating that the first time frame has a length corresponding to time for which advertisement information for 10 minutes or less can be presented, an advertisement block "voice advertisement b" indicating an abstracted voice output of an advertisement "b", and an advertisement block "display advertisement a" indicating an abstracted display of an advertisement "a", in association with one another. This indicates that the advertisement block "voice advertisement b" or the advertisement block "display advertisement a" can be disposed in the first time frame having the sum of intervention degrees of 0 and a length corresponding to 10 minutes or more. Then, an advertisement block "voice advertisement x" indicates a block "advertisement x" of a speaker, and an advertisement block "display advertisement x" indicates a block "advertisement x" of a display.

In the second rule table RT2 illustrated in FIG. 14, the time condition and the advertisement block are not associated with the intervention degree condition indicating that the sum of intervention degrees is 3. This indicates that one time frame or multiple consecutive time frames having the sum of intervention degrees of 3 or more are not determined as the first time frame in which a degree of involvement of a user is lower than a reference intervention degree, because a threshold for determining the first time frame is set to 2.

That is, in the third embodiment, the proposal unit 515 determines one time frame or multiple consecutive time frames having the sum of intervention degrees of 2 or less as the first time frame, the one time frame or multiple consecutive time frames satisfying the intervention degree condition that is associated with the time condition and the advertisement block in the second rule table RT2. Similarly to the second embodiment, in the third embodiment, the proposal unit 515 treats a first time frame, which includes multiple consecutive time frames having the sum of intervention degrees of 1 or less, as one first time frame.

Similarly to the second embodiment, the proposal unit 515 in the present example, determines three consecutive time frames "30" to "50" having the sum of intervention degrees of 0 as a primary first time frame, among eleven time frames "10" to "110" in the recipe R1 illustrated in FIG. 9. The proposal unit 515 also determines two consecutive time frames "90" to "100" having the sum of intervention degrees of 0 as a secondary first time frame.

Similarly to the second embodiment, the proposal unit 515 generates information that can identify the determined first time frame as first detailed information M11 included in the proposal information M1. In the present example, the proposal unit 515 generates a character string, "Time frames with low intervention degree (30 to 50, 90 to 100) exist. Following blocks can be added", as the first detailed information M11, for example.

When the first time frame can be determined, the proposal unit 515 determines one or more advertisement blocks as one or more candidate blocks that can be disposed in the first time frame, the one or more advertisement blocks corresponding to an intervention degree condition satisfied by the sum of intervention degrees of the first time frame and a time condition satisfied by a length of the first time frame in the second rule table RT2.

For example, the proposal unit 515 in the present example refers to the second rule table RT2 and determines five advertisement blocks "voice advertisement a", "voice advertisement b", "display advertisement a", "voice advertisement c", and "display advertisement b" as one or more candidate blocks that can be disposed in the primary first time frame "30" to "50", the five advertisement blocks corresponding to the intervention degree condition indicating the sum of intervention degrees of 0 and the time condition indicating that there is enough time to present each of advertisement information items for 1 minute or less, 10 minutes or less, and 30 minutes or less, the conditions being satisfied by the primary first time frame "30" to "50".

Similarly, the proposal unit 515 refers to the second rule table RT2 and determines three advertisement blocks "voice advertisement a", "voice advertisement b", and "display advertisement a", as one or more candidate blocks that can be disposed in a secondary first time frame "90" to "100", the three advertisement blocks corresponding to the intervention degree condition indicating the sum of intervention degrees of 0 and the time condition indicating that there is enough time to present each of advertisement information items for 1 minute or less and 10 minutes or less, the conditions being satisfied by the secondary first time frame "90" to "100".

When determining one or more candidate blocks indicating abstracted presentation of the advertisement information that can be disposed in the first time frame, the proposal unit 515 generates information indicating that an advertisement block can be inserted in the first time frame as second detailed information M12 included in the proposal information M1. In the present example, the proposal unit 515 generates a character string, "Block of advertisement presentation", for example, as the second detailed information M12.

The proposal unit 515 generates information indicating an effect obtained when the advertisement block is inserted into the first time frame as indicated by the generated second detailed information M12, as third detailed information M13 included in the proposal information M1. In the present example, the proposal unit 515 generates a character string, "Display or voice guidance of advertisement is available", for example, as the third detailed information M13.

When multiple advertisement blocks are determined as one or more candidate blocks that can be disposed in the first time frame as in the present example, the proposal unit 515 disposes one advertisement block selected from among the multiple advertisement blocks by a predetermined method within the first time frame when a first button B11 is pressed by the creator.

Examples of the predetermined method include a method for defining a priority in advance when an advertisement block is created and selecting an advertisement block in which the highest priority is defined among multiple advertisement blocks, for example. The examples of the predetermined method also include a method for randomly selecting one advertisement block. The examples of the predetermined method further include a method for selecting an advertisement block having the highest use frequency based on log information stored in a log database 43 (FIG. 1).

The present disclosure is not limited to this, and the proposal unit 515 may determine an advertisement block as a candidate block from among multiple advertisement blocks determined as candidate blocks, the advertisement block using a device 20 different from one or more devices 20 used by one or more respective blocks disposed in the first time frame.

Alternatively, the proposal unit 515 may determine an advertisement block for displaying an advertisement on a display as a candidate block even when a block of the display is disposed in the first time frame. In this case, the proposal unit 515 may cause the display to display both of contents to be displayed on the display in the block of the display disposed in the first time frame and an advertisement to be displayed on the display in the candidate block.

It is assumed that the first time frame including multiple consecutive time frames determined by the proposal unit 515 includes one time frame or multiple consecutive time frames in which one or more devices 20 to be used in one or more respective advertisement blocks determined as candidate blocks are not used. In this case, the proposal unit 515 may re-determine one time frame or multiple consecutive time frames among the one or more advertisement blocks determined as the candidate blocks as the first time frame, the one time frame or multiple consecutive time frames using no device 20 used in the one or more advertisement blocks existing in the first time frame.

For example, it is assumed that the proposal unit 515 in the present example determines three advertisement blocks "voice advertisement a", "voice advertisement b", and "display advertisement a" as candidate blocks that can be disposed in the secondary first time frame "90" to "100". In this case, a block "boiling" of the display using the display is disposed in the time frame "90" included in the secondary first time frame "90" to "100", and no block using the devices 20 used by the three respective advertisement blocks is disposed in the time frame "100".

In this case, the proposal unit 515 may re-determine the time frame "100" as the secondary first time frame. Then, the proposal unit 515 may determine three advertisement blocks "voice advertisement a", "voice advertisement b", and "display advertisement a" as one or more candidate blocks that can be disposed in the redetermined secondary first time frame "100", the three advertisement blocks being associated with the intervention degree condition and the time condition satisfied by the redetermined secondary first time frame "100" in the second rule table RT2.

FIG. 15 is a diagram illustrating an example of a recipe R13 reflecting still another proposal contents. For example, it is assumed that, when the first button B11 (FIG. 6) is pressed, the advertisement block "display advertisement b" is selected as a candidate block that can be disposed in the primary first time frame "30" to "50", and the advertisement block "display advertisement a" is selected as a candidate block that can be disposed in the redetermined secondary first time frame "100".

In this case, as illustrated in FIG. 15, the proposal unit 515 disposes the block "advertisement b" of the display in the primary first time frame "30" to "50", and disposes the block "advertisement a" of the display in the redetermined secondary first time frame "100".

FIG. 15 illustrates an example in which a calculator 513 recalculates the sum of intervention degrees of each of time frames after reflecting the proposal contents, and a presentation unit 514 displays information on the sum of intervention degrees recalculated for each of the time frames on the assumption that each of the blocks "advertisement b" and "advertisement a" of the display has an intervention degree of "1".

As described above, the third embodiment enables the creator to create an efficient program of a recipe capable of displaying advertisement information in a time frame with a low degree of involvement of a user.

The present disclosure can adopt modifications below.

Figure 16:
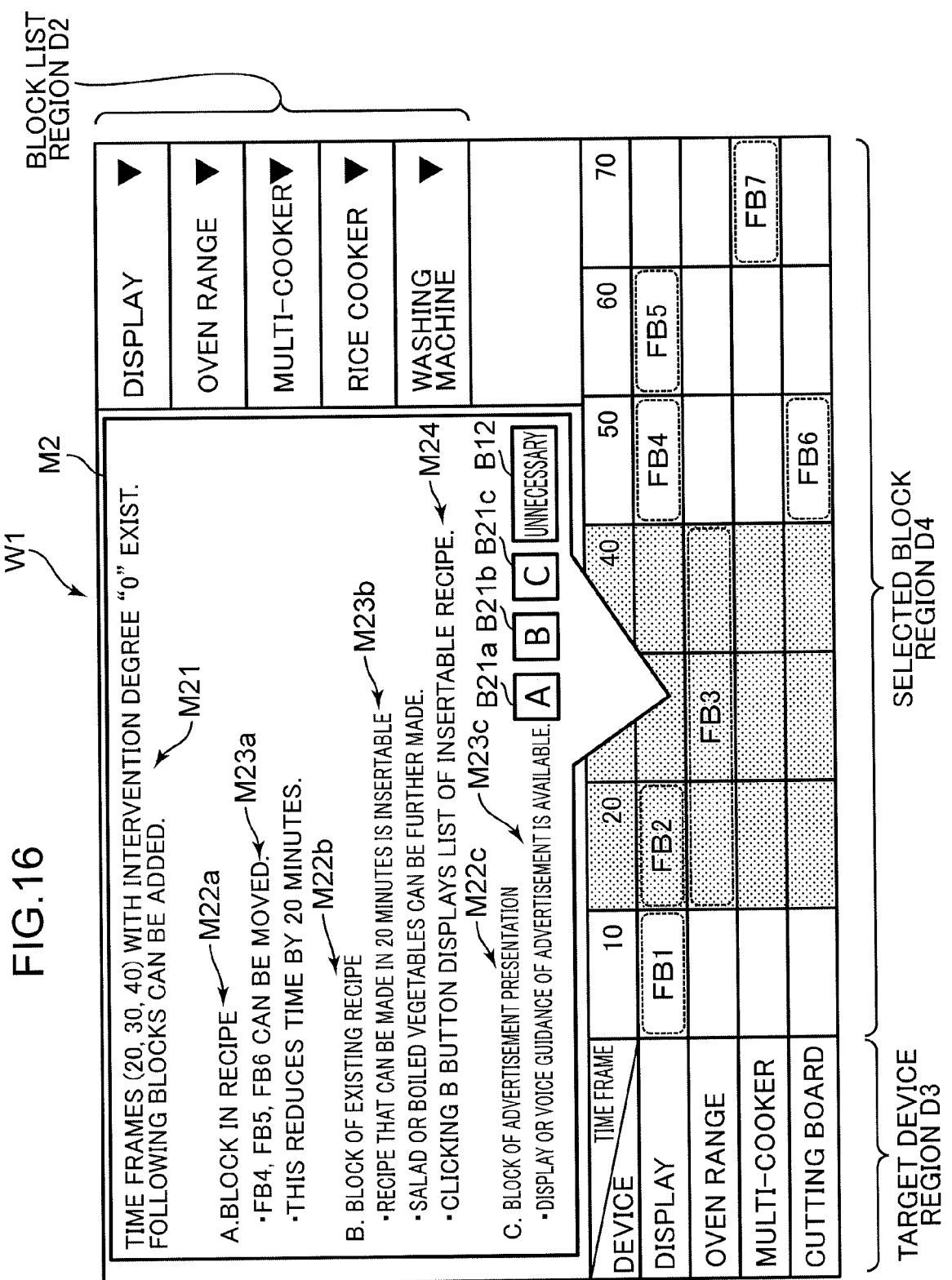
FIG. 16 is a diagram illustrating an example of a recipe creation screen on which proposal information of a modification is displayed.

(1) FIG. 16 is a diagram illustrating an example of a recipe creation screen W1 on which proposal information M2 is displayed in a modification. As illustrated in FIG. 16, the proposal unit 515 may cause the recipe creation screen W1 to display the proposal information M2 including: first detailed information M21 generated by any one of the methods of the first to third embodiments; and second detailed information M22a and third detailed information M23a generated by the method described in the first embodiment, second detailed information M22b and third detailed information M23b generated by the method described in the second embodiment, and third detailed information M22c and third detailed information M23c generated by the method described in the third embodiment, which are for one or more first time frames indicated by the first detailed information M21.

Additionally, the proposal information M2 may include a first reflection button B21a, a second reflection button B21b, a third reflection button B21c, and the second button B12 (FIG. 6) described in the first embodiment, as illustrated in FIG. 16.

The first reflection button B21a causes the proposal unit 515 to reflect one or more candidate blocks on a first time frame, the one or more candidate blocks being included in one or more first blocks (first block group) that constitute a recipe created by a creator and that is determined by the method described in the first embodiment. That is, when the first reflection button B21a is pressed by a worker, the proposal unit 515 moves the one or more candidate blocks to the first time frame as described with reference to FIGS. 7 and 11.

The second reflection button B21b causes the proposal unit 515 to reflect one or more candidate blocks on the first time frame, the one or more candidate blocks being included in one or more blocks (second block group) that constitute a program of an existing recipe created and that is determined by the method described in the second embodiment. When the second reflection button B21b is pressed by a worker, the proposal unit 515 disposes the one or more candidate blocks in the first time frame as described with reference to FIG. 13.

It is assumed that the proposal unit 515 determines one or more candidate blocks that can be disposed within the first time frame from among multiple existing recipes as described in the second embodiment. In this case, the proposal unit 515 displays an operation screen for selecting any one of the multiple existing recipes when the second reflection button B21*b* is pressed. The proposal unit 515 then disposes one or more blocks constituting the existing recipe selected on the operation screen within the first time frame. As illustrated in FIG. 16, the proposal unit 515 also may include information M24 in the proposal information M2, the information M24 notifying a worker that the operation screen is displayed when the second reflection button B21*b* is pressed.

The third reflection button B21*c* causes the proposal unit 515 to reflect one or more candidate blocks on the first time frame, the one or more candidate blocks being included in one or more blocks (third block group) that represents abstracted presentation of advertisement information and that is determined by the method described in the third embodiment. That is, when the third reflection button B21*c* is pressed by the worker, the proposal unit 515 may move the one or more candidate blocks to the first time frame as described with reference to FIG. 15.

The present modification may cause the proposal unit 515 not to include second detailed information and third detailed information in the proposal information M2, the second detailed information and the third detailed information being generated by the method described in any one of the first to third embodiments, such as the second detailed information M22*a* and the third detailed information M23*a* generated by the method described in the first embodiment, the second detailed information M22*b* and the third detailed information M23*b* generated by the method described in the second embodiment, or the third detailed information M22*c* and the third detailed information M23*c* generated by the method described in the third embodiment.

The proposal information M2 accordingly may not include a button among the first reflection button B21*a*, the second reflection button B21*b*, and the third reflection button B21*c*, the button being used for reflecting one or more candidate blocks determined by the method described in any one of the embodiments on the first time frame.

As a result, the proposal unit 515 may propose that the one or more candidate blocks determined by the methods described in two embodiments among the first to third embodiments can be disposed in the first time frame.

(2) During execution of a program of a recipe stored in a recipe database 42 in a user terminal 30, the user terminal 30 may not only display an intervention degree of a user in a present time frame, but also propose to the user to perform other work depending on the intervention degree.

Figure 17:
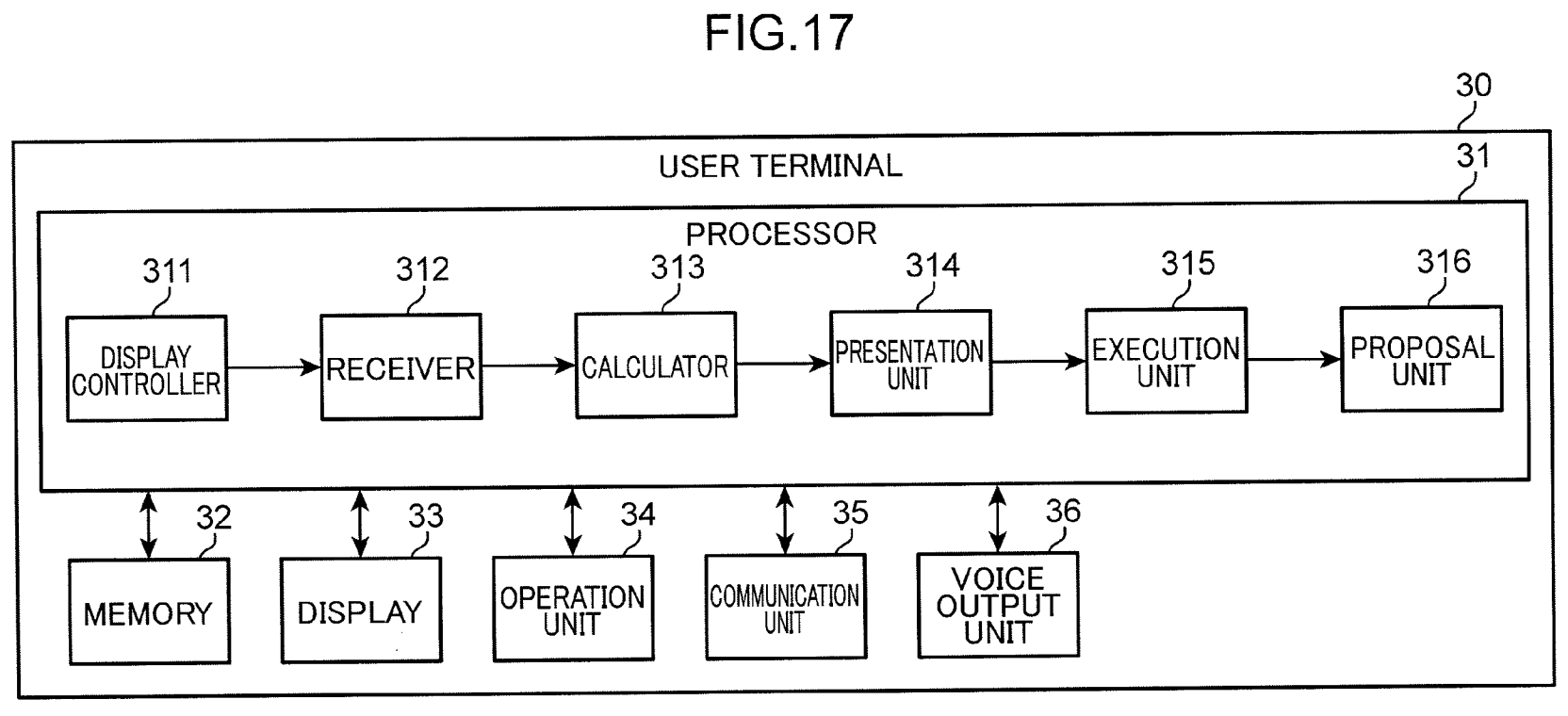

Hereinafter, an implementation example of the present modification will be described. FIG. 17 is a block diagram illustrating an example of a functional configuration of the user terminal 30. As illustrated in FIG. 17, the user terminal 30 includes not only a memory 32, a display 33, an operation unit 34, and a communication unit 35, which are respectively similar to the memory 52, the display 53, the operation unit 54, and the communication unit 55 (FIG. 4) included in the development terminal 50, but also a processor 31 and a voice output unit 36.

The processor 31 includes a central processing unit (CPU), for example. The processor 31 includes a display controller 311, a receiver 312, a calculator 313, a presentation unit 314, an execution unit 315, and a proposal unit 316. The display controller 311 to the proposal unit 316 are implemented by the processor 31 executing a recipe execution program, for example.

The voice output unit 36 includes a speaker, an earphone jack, or the like, and outputs various voices or voice signals instructed from the processor 31.

Figure 18:
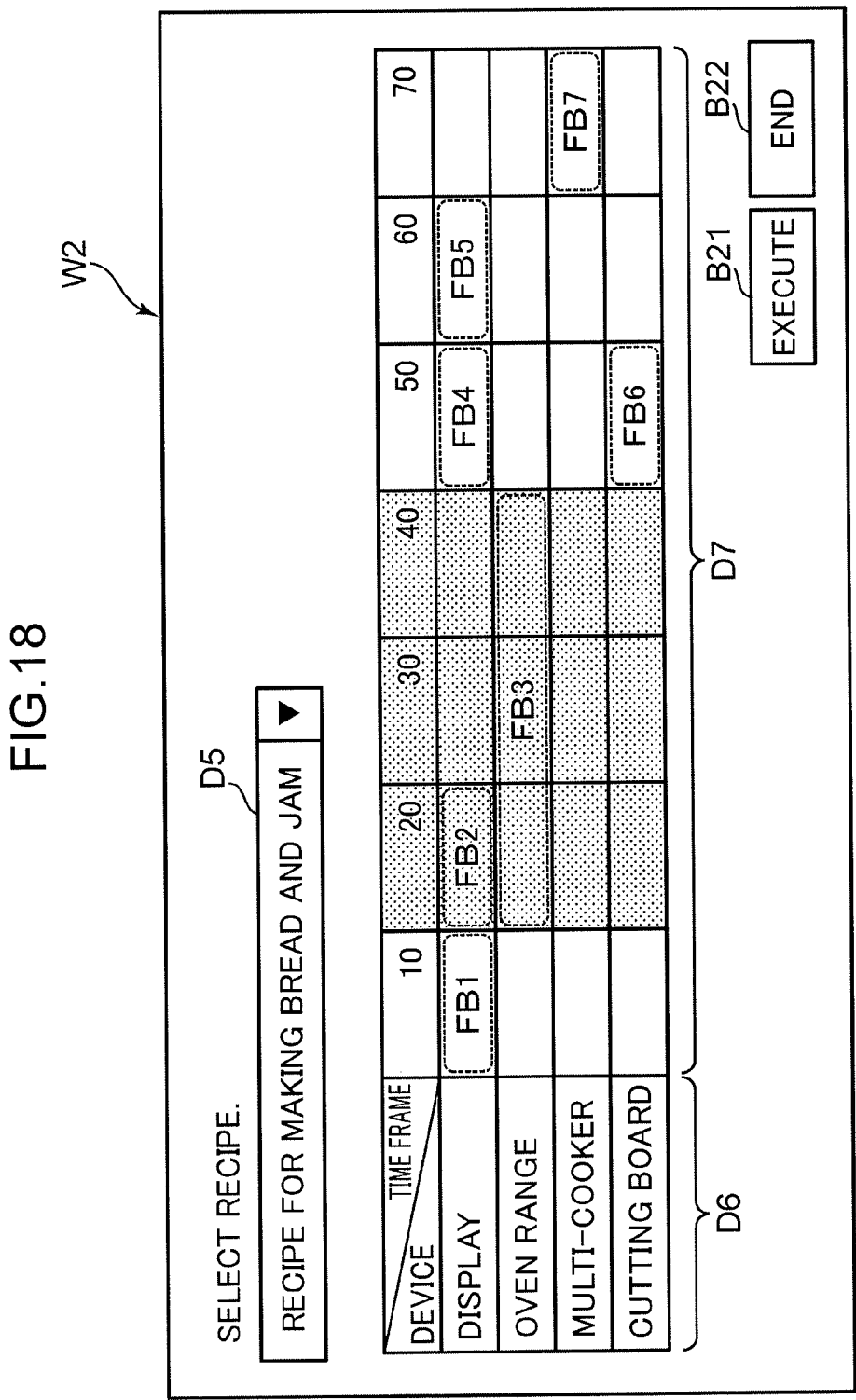
FIG. 18 is a diagram illustrating an example of a recipe execution screen.

Hereinafter, details of the display controller 311 to the proposal unit 316 will be described with reference to FIG. 18. FIG. 18 is a diagram illustrating an example of a recipe execution screen W2. Specifically, when a user performs a predetermined operation using the operation unit 34, the display controller 311 causes the recipe execution screen W2 (second operation screen) as illustrated in FIG. 18 to be displayed. The recipe execution screen W2 includes a list box D5, a block display region D7, a device display region D6, an execution button B21, and an end button B22.

The list box D5 is for selecting a name of a program of one recipe to be executed from a list of program names of recipes stored in the recipe database 42.

The block display region D7 allows multiple blocks constituting a program indicated by the name of the program of the recipe selected using the list box D5 to be disposed. Similarly to the selected block region D4 (FIG. 5A) of the recipe creation screen W1, the block display region D7 displays multiple time frames each indicating timing of performing operation of a device 20 indicated by a block.

Similarly to the target device region D3 (FIG. 5A) of the recipe creation screen W1, the device display region D6 displays devices 20 corresponding to the respective blocks disposed in the block display region D7.

The execution button B21 is for executing the program of the recipe selected using the list box D5. The end button B22 is for ending the execution of the program of the recipe selected using the list box D5.

To display the recipe execution screen W2, the display controller 311 controls the communication unit 35 to acquire the list of program names of recipes stored in the recipe database 42 via the communication network 90. The display controller 511 displays the list box D5 for selecting a name of a program of one recipe to be executed from the acquired list of program names in the recipe execution screen W2.

The receiver 312 receives various operations on the recipe execution screen W2 performed by the user.

Specifically, the receiver 312 receives an operation of selecting a program of one recipe to be executed. For details, it is assumed that the user performs an operation of selecting the name of the program of the one recipe to be executed using the list box D5. In this case, the receiver 312 receives an operation of selecting the program indicated by the name of the program of the one recipe as the program of the one recipe to be executed.

When receiving the operation of selecting the program of the one recipe to be executed, the receiver 312 controls the communication unit 35 to request the application providing server 10 to transmit the program of the one recipe selected by the operation via the communication network 90.

The application providing server 10 accordingly acquires the program of the one recipe requested from the user terminal 30 from the recipe database 42 via the communication network 90, and returns the program of the one recipe to the user terminal 30. As a result, the receiver 312 acquires the program of the one recipe to be executed that is selected by the user. FIG. 18 illustrates an example in which the receiver 312 receives an operation of selecting a program of a recipe for making bread and jam as the program of the one recipe to be executed.

The receiver 312 disposes multiple blocks constituting the acquired a program of one recipe in time frames of the recipe execution screen W2, the time frames corresponding to time frames disposed in the program of the one recipe.

Specifically, the receiver 312 generates an image indicating each of the blocks that constitutes the program of the one recipe acquired and that has a width corresponding to a duration of the corresponding one of the blocks. The receiver 312 displays the image in association with one or more time frames corresponding to one or more time frames in which each of the blocks is disposed in the program of the one recipe among the multiple time frames displayed in the block display region D7.

When the device 20 corresponding to the block is not displayed in the device display region D6 at the beginning of a line in which the block is disposed, the receiver 312 displays the device 20 corresponding to the block in the target device region D3 at the beginning of the line in which the block is disposed.

For example, FIG. 18 illustrates an example in which the receiver 312 disposes a block "FB3" of the oven range, the block "FB3" to be executed at timing during the time frames "20" to "40" and having a duration of 30 minutes, in the time frames "20" to "40" in the block display region D7 in the program of the recipe for making bread and jam. FIG. 18 illustrates the example in which the receiver 312 displays the oven range, which is the device 20 used in the block, in the target device region D3 at the beginning of the line in which the block is disposed.

The calculator 313 calculates the sum of intervention degrees of one or more blocks disposed in each of time frames on the recipe execution screen W2, similarly to the calculator 513 (FIG. 4) of the development terminal 50. The presentation unit 314 displays (outputs) each of the time frames and information on the sum of intervention degrees calculated by the calculator 313 for the corresponding one of the time frames in association with each other on the recipe execution screen W2, similarly to the presentation unit 514 (FIG. 4) of the development terminal 50.

For example, FIG. 18 illustrates an example in which the time frames "20" to "40" and the information on the sum of intervention degrees for the time frames "20" to "40" are displayed in association with each other with the sum of intervention degrees of one or more blocks disposed in the time frames "20" to "40", the sum being calculated as 0 by the calculator 313 in the program of the recipe for making bread and jam, and with columns corresponding to the time frames "20" to "40" with a background in a predetermined color indicating 0 with the presentation unit 314. That is, in this case, a color corresponding to the sum of intervention degrees serves as the information on the sum of intervention degrees.

The method for displaying information on the sum of intervention degrees of each of the time frames using the presentation unit 314 is not limited to the above. For example, the presentation unit 314 may display a character string indicating the sum of intervention degrees of each of the time frames calculated by the calculator 313, such as "intervention degree 0", above or below each of the time frames, or may display the character string as a balloon message. That is, in this case, a character string corresponding to the sum of intervention degrees serves as the information on the sum of intervention degrees.

The execution unit 315 receives an operation of executing or ending the program of the one recipe acquired by the receiver 312, and executes or ends the program of the one recipe. Specifically, when an operation of pressing the execution button B21 on the recipe execution screen W2 is performed, the execution unit 315 receives the operation and executes the program of the one recipe acquired by the receiver 312. In contrast, when an operation of pressing the end button B22 on the recipe execution screen W2 is performed, the execution unit 315 receives the operation and ends execution of the program of the one recipe acquired by the receiver 312.

The proposal unit 316 displays (outputs) proposal information (second proposal information) that proposes performing predetermined work during execution of the program of the one recipe acquired by the receiver 312 based on the sum of intervention degrees of the time frame corresponding to a present time on the recipe execution screen W2, in association with a time frame corresponding to the present time.

Specifically, after the execution of the program of the one recipe is started, the proposal unit 316 controls the communication unit 35 to periodically refer to log information on the device 20 used in the program of the one recipe stored in the log database 43 via the communication network 90 at a predetermined cycle shorter than the time frame. As a result, the proposal unit 316 grasps which device 20 corresponding to a block disposed in a time frame in the program of the one recipe is currently performed to grasp the time frame corresponding to the present time on the recipe execution screen W2.

The method for grasping the time frame corresponding to the present time with the proposal unit 316 is not limited to the above. For example, after the execution of the program of the one recipe is started, the proposal unit 316 may communicate with the device 20 used by one or more blocks included in the program of the one recipe to grasp which device 20 corresponding to a block disposed in a time frame in the program of the one recipe is currently performed.

Figure 19:
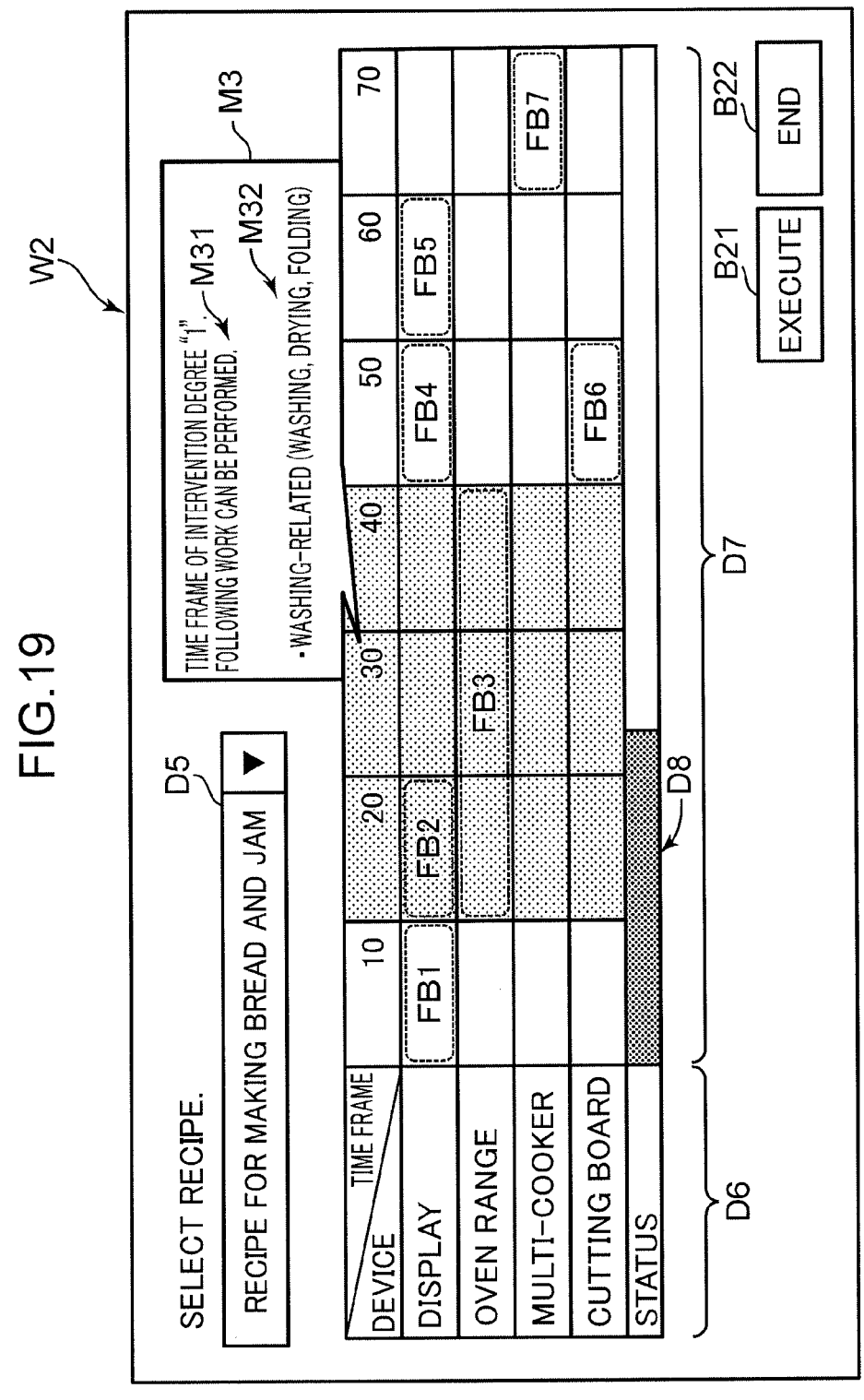
FIG. 19 is a diagram illustrating an example of a recipe execution screen on which proposal information is displayed.

FIG. 19 is a diagram illustrating an example of the recipe execution screen W2 on which proposal information M3 is displayed. As illustrated in FIG. 19, the proposal unit 316 displays an image D8 for indicating a present time frame to a user. The image D8 in FIG. 19 indicates that the time frame "30" corresponds to the present time. Then, the proposal unit 316 displays the proposal information M3 that proposes performing the predetermined work based on the sum of intervention degrees of the grasped time frame, in association with the grasped time frame, as illustrated in FIG. 19.

As illustrated in FIG. 19, the proposal information M3 includes first detailed information M31 indicating information on an intervention degree associated with the present time frame, and second detailed information M32 indicating work to be proposed to the user in the present time frame. A method for generating the first detailed information M31 and the second detailed information M32 included in the proposal information M3 with the proposal unit 316 will be described later.

Figure 20:
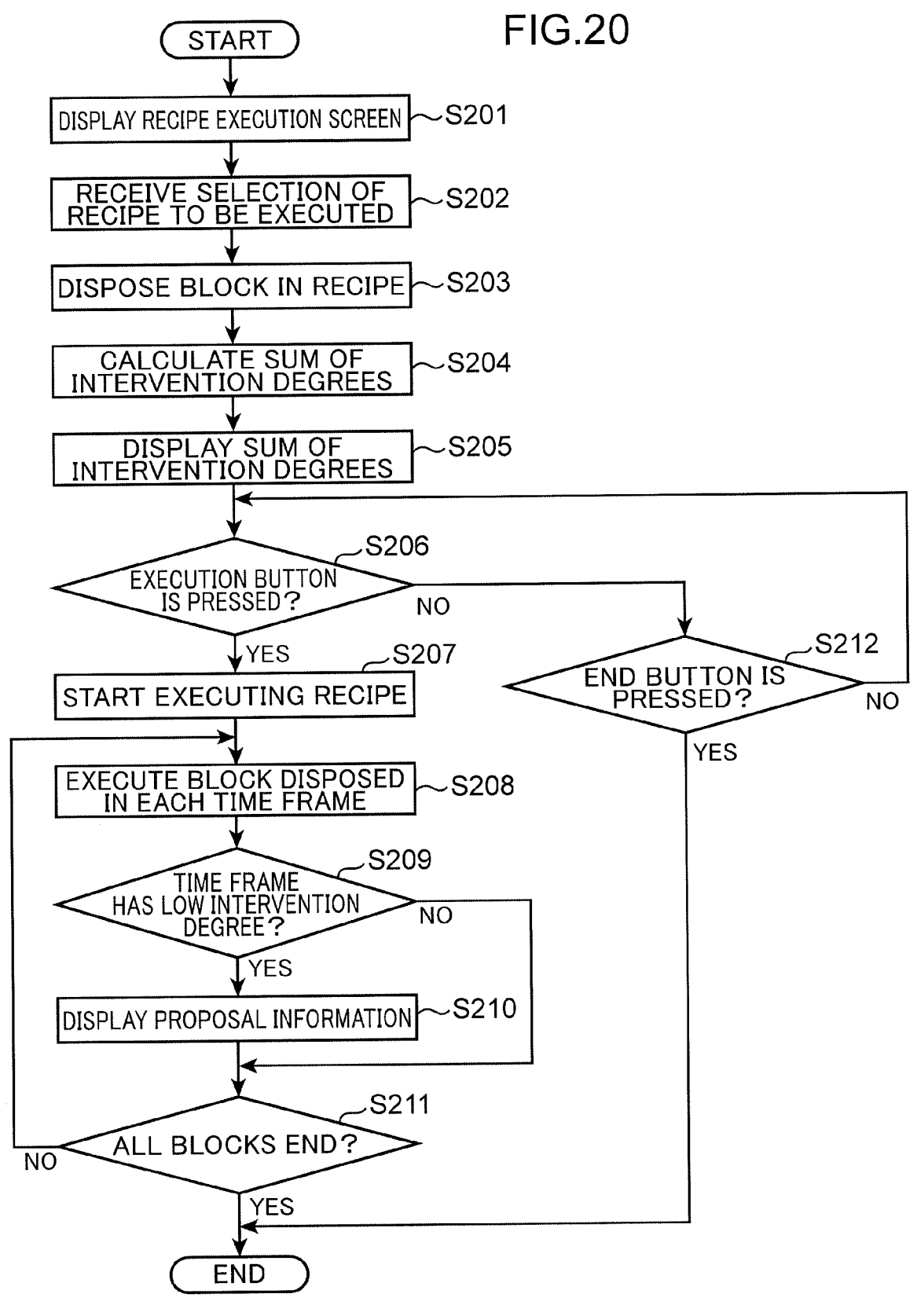
FIG. 20 is a flowchart illustrating an example of recipe execution processing.

Next, a flow of recipe execution processing in the user terminal 30 will be described. FIG. 20 is a flowchart illustrating an example of the recipe execution processing.

When the creator performs a predetermined operation using the operation unit 34, the display controller 311 causes the display 33 to display the recipe execution screen W2 in step S201. This operation starts the recipe execution processing illustrated in FIG. 20.

In subsequent step S202, the receiver 312 receives an operation of selecting a program of one recipe to be executed, and acquires the program of the one recipe.

In subsequent step S203, the receiver 312 disposes multiple blocks constituting the program of the one recipe acquired in step S202 in time frames of the recipe execution screen W2, the time frames corresponding to time frames disposed in the program of the one recipe.

In step S204, the calculator 313 calculates the sum of intervention degrees of one or more blocks disposed in each of the time frames in step S203 on the recipe execution screen W2.

In step S205, the presentation unit 314 displays each of the time frames and information on the sum of intervention degrees calculated in step S204 for the corresponding one of the time frames in association with each other on the recipe execution screen W2.

When the user presses the execution button B21 in step S206 (YES in step S206), the execution unit 315 starts to execute the program of the one recipe in step S207, the program of the one recipe being acquired in step S202.

In contrast, it is assumed that the user does not press the execution button B21 in step S206 (NO in step S206), and the user presses the end button B22 in step S212. In this case (YES in step S212), the execution unit 315 ends the execution of the program of the one recipe acquired in step S202, and ends the recipe execution processing.

It is assumed that the user does not press the execution button B21 in step S206 (NO in step S206), and the user does not press the end button B22 in step S212. In this case (NO in step S212), the processing in and after step S206 is repeated.

In step S208, the execution unit 315 executes one or more blocks disposed in each of the time frames in order from one or more blocks disposed in a first time frame in the program of the one recipe acquired in step S202.

In step S209, the proposal unit 316 determines whether a time frame corresponding to a present time has a degree of involvement of a user lower than a reference intervention degree based on the sum of intervention degrees of the time frame corresponding to the present time on the recipe execution screen W2. Details of the determination method in step S209 will be described later.

When determining that the time frame corresponding to the present time has the degree of involvement of a user lower than the reference intervention degree (YES in step S209) in step S209, the proposal unit 316 displays the proposal information M3 that proposes performing the predetermined work in association with the time frame corresponding to the present time in step S210. Details of the method for determining the predetermined work in step S210 will be described later.

In step S211, when the execution unit 315 does not execute some blocks included in the program of the one recipe acquired in step S202 (NO in step S211), the processing in and after step S208 is performed. In contrast, when execution of all the blocks included in the program of the one recipe acquired in step S202 is ended (YES in step S211), the execution unit 315 ends the recipe execution processing.

Next, a method in which the proposal unit 316 determines whether a degree of involvement of a user in the time frame corresponding to the present time is lower than the reference intervention degree in step S209 and a method for creating the proposal information M3 in step S210 will be described.

The following description shows an example in which the proposal unit 316 makes the determination in step S209 and creates the proposal information M3 in step S210 during the execution of the program of the recipe R1 illustrated in FIG. 9.

Specifically, the proposal unit 316 uses a third rule table RT3 stored in advance in the memory 52 (FIG. 4) to determine whether a present time frame has a degree of involvement of a user lower than the reference intervention degree, and determine predetermined work.

FIG. 21 is a diagram illustrating an example of the third rule table RT3. The memory 52 (FIG. 4) preliminarily stores the third rule table RT3 illustrated in FIG. 21. The third rule table RT3 is used to propose to the user to perform a predetermined operation in a time frame corresponding to a present time. Specifically, as illustrated in FIG. 21, the third rule table RT3 defines a relationship among an intervention degree condition to be satisfied by the sum of intervention degrees of a time frame corresponding to a present time frame, a time condition to be satisfied by a length of a target time frame that is one time frame or multiple consecutive time frames from the time frame corresponding to the present time to a time frame having the sum of intervention degrees different from that of the time frame corresponding to the present time, and work that can be proposed to the user in the time frame corresponding to the present time.

Hereinafter, the work that can be proposed to the user in the time frame corresponding to the present time is referred to candidate work, and the one time frame or multiple consecutive time frames from the time frame corresponding to the present time to the time frame having the sum of intervention degrees different from that of the time frame corresponding to the present time are referred to as a target time frame.

For example, the third rule table RT3 illustrated in FIG. 21 shows the intervention degree condition indicating that the sum of intervention degrees of the first time frame is 0, the time condition indicating that the target time frame has a length corresponding to time in which work of 30 minutes or less can be executed, and shopping, which are associated with one another. This indicates that when the time frame corresponding to the present time has the sum of intervention degrees of 0 and the target time frame has a length of 30 minutes or more, the shopping can be proposed to the user.

In the third rule table RT3 illustrated in FIG. 21, the time condition and the candidate work are not associated with the intervention degree condition indicating that the sum of intervention degrees is 3. This indicates that a threshold for determining the time frame corresponding to the present time as a time frame having a degree of involvement of a user lower than the reference intervention degree is set to 2. That is, this indicates that the proposal unit 316 does not determine the time frame corresponding to the present time as a time frame having a degree of involvement of a user lower than the reference intervention degree when the time frame corresponding to the present time has the sum of intervention degrees of 3 or more.

That is, when the sum of intervention degrees of a time frame corresponding to the present time satisfies the intervention degree condition in which the time condition and the candidate work are associated with each other in the third rule table RT3, the proposal unit 316 determines the time frame corresponding to the present time as the time frame having a degree of involvement of a user lower than the reference intervention degree. In this case, the proposal unit 316 determines a target time frame as a time frame in which the proposal information M3 is displayed, the target time frame being one time frame or multiple consecutive time frames from the time frame corresponding to the present time to the time frame having the sum of intervention degrees different from that of the time frame corresponding to the present time.

For example, it is assumed that the time frame corresponding to the present time is the time frame "30" having the sum of intervention degrees of 0 in the recipe R1 illustrated in FIG. 9. In this case, the third rule table RT3 illustrated in FIG. 21 shows the time frame "30" corresponding to the present time satisfies the intervention degree condition that indicates that the sum of intervention degrees is 0 and that is associated with the time condition and the candidate work. Thus, the proposal unit 316 determines that the time frame "30" corresponding to the present time has a degree of involvement of a user lower than the reference intervention degree.

In this case, the proposal unit 316 determines a target time frame as a time frame in which the proposal information M3 is displayed, the target time frame being multiple consecutive time frames "30" to "50" from the time frame "30" corresponding to the present time to the time frame "60" having the sum of intervention degrees different from that of the time frame corresponding to the present time.

Even when the time frame "90" having the sum of intervention degrees of 0 in the recipe R1 illustrated in FIG. 9 corresponds to the present time, the proposal unit 316 determines that the time frame "90" corresponding to the present time has a degree of involvement of a user lower than the reference intervention degree. Then, the proposal unit 316 determines a target time frame as a time frame in which the proposal information M3 is displayed, the target time frame being multiple consecutive time frames "90" to "100" from the time frame "90" corresponding to the present time to the time frame "110" having the sum of intervention degrees different from that of the time frame corresponding to the present time.

After determining the target time frame, the proposal unit 316 determines candidate work as work that can be proposed to the user in the time frame corresponding to the present time, the candidate work corresponding to the intervention degree condition satisfied by the sum of intervention degrees of the time frame corresponding to the present time and the time condition satisfied by a length of the target time frame in the third rule table RT3.

For example, the present example shows the time frame "30" that corresponds to the present time and that satisfies the intervention degree condition indicating that the sum of intervention degrees in the third rule table RT3 is 0, and the target time frames "30" to "50" that have a length satisfying the time condition indicating time in which work for 30 minutes or less can be performed in the third rule table RT3. Thus, the proposal unit 316 determines "shopping" as the work that can be proposed to the user in the time frame "30" corresponding to the present time, the "shopping" being the candidate work associated with the intervention degree condition and the time condition in the third rule table RT3.

When determining the work that can be proposed to the user in the time frame corresponding to the present time, the proposal unit 316 generates the proposal information M3 including the first detailed information M31 indicating the sum of intervention degrees of the time frame corresponding to the present time and the second detailed information M32 indicating the work determined as the work that can be proposed to the user.

In the present example, the proposal unit 316 generates a character string, "This is a time frame having an intervention degree "0". The work below can be performed", for example, as the first detailed information M31. The proposal unit 316 also generates a character string, "shopping", as the second detailed information M32, the character string, "shopping", indicating shopping determined as the work that can be proposed to the user in the time frame "30" corresponding to the present time.

The third rule table RT3 may include work determined as candidate work on the premise that work with the device 20 is completed, such as work of drying laundry washed by a washing machine, for example. In this case, the proposal unit 316 determines whether the work with the device 20 on the premise is completed with reference to log information stored in the log database 43 when determining the work on the premise that the work with the device 20 is completed as the work to be proposed to the user in the time frame corresponding to the present time. When determining that the work with the device 20 on the premise is completed, the proposal unit 316 generates the second detailed information M32 indicating the determined work.

This configuration enables a user to easily grasp a degree of involvement of a user in each time frame during execution of a program of one selected recipe. This configuration also enables the user to perform another work according to contents of proposal indicated by the proposal information M3 during the execution of the program of the one selected recipe. As a result, the user can effectively use time.

In this configuration, the processor 31 may not include the proposal unit 316 for simplification.

The present disclosure enables an application to be created in consideration of an intervention degree of a user, and thus is useful for creating an application that controls multiple devices and that is convenient for the user.

The invention claimed is:

1. An information processing method comprising, by a computer of a system that creates an application of controlling multiple devices:

outputting a first operation screen having multiple time frames;

receiving a first operation of disposing multiple blocks in columns of the corresponding multiple time frames to generate the application, the multiple blocks each having operation of at least one device of the multiple devices and an intervention degree indicating a degree of involvement of a user in the operation of the at least one device;

calculating a sum of intervention degrees of one or more blocks disposed in each of the time frames;

outputting the application including information on the sum of intervention degrees and the multiple blocks disposed in the multiple time frames, wherein each of the multiple blocks include a control program for controlling operation of the at least one device; and controlling, simultaneously via a single user interface and using the control program associated with one block, the multiple devices in collaboration with one another, wherein the multiple devices include at least one electric appliance.

2. The information processing method according to claim 1, further comprising, by the computer:

determining a first time frame based on the sum of intervention degrees of the time frames, the first time frame being one time frame or multiple consecutive time frames in which a degree of involvement of a user is lower than a reference intervention degree; and outputting proposal information indicating a proposal of disposing another one or more blocks for the first time frame.

3. The information processing method according to claim 2, wherein the other one or more blocks are included in the multiple blocks disposed by the first operation.

4. The information processing method according to claim 2, wherein the other one or more blocks are one or more blocks constituting a created application stored in the system.

5. The information processing method according to claim 2, wherein the other one or more blocks are one or more blocks indicating presentation of advertisement information.

6. The information processing method according to claim 2, wherein the other one or more blocks are included in at least two block groups among a first block group including multiple blocks disposed by the first operation, a second block group including one or more blocks constituting a created application stored in the system, and a third block group including one or more blocks indicating presentation of advertisement information, and the proposal information includes information indicating an effect obtained by disposing the other one or more blocks.

7. The information processing method according to claim 1, further comprising, by the computer:

receiving setting of a timer condition for automatically continuing operation of the at least one device indicated by each of the multiple blocks disposed by the first operation for a predetermined time for the respective multiple blocks; and reducing the intervention degree of each of the blocks in which the timer condition is set by a predetermined degree.

8. The information processing method according to claim 3, wherein each of the blocks further has duration during which the operation of the at least one device indicated by the corresponding one of the blocks is continued, and the outputting the proposal information includes determining one or more blocks among the multiple blocks disposed by the first operation as the other one or more blocks to move the one or more blocks among the multiple blocks disposed by the first operation to the first time frame, using a table defining a relationship among a first intervention degree condition to be satisfied by the sum of intervention degrees of the first time frame, a second intervention degree condition to be satisfied by the intervention degree of the one or more blocks, and a time condition that is based on a length of the first time frame and that is to be satisfied by the duration of the one or more blocks, the one or more blocks having the intervention degree and the duration that satisfy the second intervention degree condition and the time condition that are corresponding to the first intervention degree condition satisfied by the sum of intervention degrees of the first time frame, respectively, in the table.

9. The information processing method according to claim 4, wherein the outputting the proposal information includes determining an existing application stored in the system as the created application to dispose the existing application in the first time frame, using a first table defining a relationship among an intervention degree condition to be satisfied by the sum of intervention degrees of the first time frame, the time condition to be satisfied by the length of the first time frame, and the existing application, the existing application corresponding to the intervention degree condition satisfied by the sum of intervention degrees of the first time frame and the time condition satisfied by the length of the first time frame in the first table.

10. The information processing method according to claim 5, wherein the outputting the proposal information includes determining one or more advertisement blocks as the other one or more blocks to dispose each of the one or more advertisement blocks indicating presentation of advertisement information in the first time frame, using a second table defining a relationship among an intervention degree condition to be satisfied by the sum of intervention degrees of the first time frame, a time condition to be satisfied by the length of the first time frame, and the one or more advertisement blocks, the one or more advertisement blocks corresponding to the intervention degree condition satisfied by the sum of intervention degrees of the first time frame and the time condition satisfied by the length of the first time frame in the second table.

11. The information processing method according to claim 1, further comprising, by the computer:

outputting a second operation screen having multiple time frames;

disposing multiple blocks constituting one application to be executed in a time frame of the second operation screen, the time frame corresponding to a time frame disposed in the one application;

calculating a sum of intervention degrees of one or more blocks disposed in each time frame of the second operation screen; and outputting an application including information on a sum of intervention degrees of the one or more blocks disposed in each time frame of the second operation screen and the multiple blocks disposed in the corresponding multiple time frames of the second operation screen.

12. The information processing method according to claim 11, further comprising, by the computer:

receiving an operation of executing the one application; and outputting second proposal information proposing performing predetermined work during the execution of the one application based on the sum of intervention degrees of the time frame corresponding to a present time on the second operation screen.

13. The information processing method according to claim 1, wherein an intervention degree of each of the blocks is determined based on:

a degree of necessity of vision, hearing, or smell of the user for operation of the at least one device indicated by each block;

a degree of necessity of manual work of the user for operation of the at least one device indicated by each block; or a frequency of the necessity of vision, hearing, or smell of the user, or manual work of the user, for the operation of the at least one device indicated by each of the blocks.

14. A non-transitory computer readable storage medium storing a program for causing a computer of a system that creates an application of controlling multiple devices to function, the program causing the computer to function as:

an output controller that outputs a first operation screen having multiple time frames;

a receiver that receives a first operation of disposing multiple blocks in columns of the corresponding multiple time frames to generate the application, the multiple blocks each having operation of at least one device of the multiple devices and an intervention degree indicating a degree of involvement of a user in the operation of the at least one device;

a calculator that calculates a sum of intervention degrees of one or more blocks disposed in each of the time frames; and a presentation unit that outputs the application including information on the sum of intervention degrees and the multiple blocks disposed in the multiple time frames, wherein each of the multiple blocks include a control program for controlling operation of the at least one device; and a processor that controls, simultaneously via a single user interface and using the control program associated with one block, the multiple devices in collaboration with one another, wherein the multiple devices include at least one electric appliance.

* * * * *